(12) United States Patent
Gottwerth et al.

(10) Patent No.: US 8,670,321 B2
(45) Date of Patent: *Mar. 11, 2014

(54) SYSTEMS AND METHODS TO REROUTE INTERNET PROTOCOL TRAFFIC BASED ON NETWORK USER PREFERENCES

(71) Applicant: AT&T Intellectual Property I, L.P., Atlanta, GA (US)

(72) Inventors: Marc Owen Nutto Gottwerth, Middletown, NJ (US); Margaret T. Chiosi, E Brunswick, NJ (US); Joseph Thomas Stango, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,648

(22) Filed: Nov. 27, 2012

(65) Prior Publication Data

US 2013/0083651 A1    Apr. 4, 2013

Related U.S. Application Data

(63) Continuation of application No. 12/330,366, filed on Dec. 8, 2008, now Pat. No. 8,331,235.

(51) Int. Cl.
*H04L 1/00* (2006.01)

(52) U.S. Cl.
USPC .......................................... 370/235; 370/245

(58) Field of Classification Search
USPC .................................. 370/216, 225, 235, 245
See application file for complete search history.

(56) References Cited

U.S. PATENT DOCUMENTS

| 5,222,128 A | 6/1993 | Daly et al. |
| 5,416,834 A | 5/1995 | Bales et al. |

(Continued)

OTHER PUBLICATIONS

USPTO, "Office Action," issued in connection with U.S. Appl. No. 12/330,366, on Jun. 6, 2010 (16 pages).

(Continued)

*Primary Examiner* — Yemane Mesfin
*Assistant Examiner* — Wanda Z Russell
(74) *Attorney, Agent, or Firm* — Hanley, Flight & Zimmerman, LLC

(57) ABSTRACT

Example methods disclosed herein to reroute Internet Protocol traffic include, after detecting a defect in a first communication path for routing user traffic associated with a network user, causing a router to buffer the user traffic for a first time period having a first duration before causing the router to reroute the user traffic over a second communication path, the first duration based on a first threshold. Such example methods also include, after detecting correction of the defect, causing the router to continue to route the user traffic over the second communication path for a second time period having a second duration before causing the router to revert to routing the user traffic over the first communication path, the second duration based on a second threshold, the first and second thresholds being adjustable based on a number of cycles of network defects and network corrections counted within a tracking period.

12 Claims, 11 Drawing Sheets

(56) References Cited

U.S. PATENT DOCUMENTS

| | | | |
|---|---|---|---|
| 5,905,714 A * | 5/1999 | Havansi | 370/242 |
| 5,905,715 A | 5/1999 | Azarmi et al. | |
| 5,974,459 A | 10/1999 | Chattopadhyay et al. | |
| 6,606,380 B1 | 8/2003 | Petersen et al. | |
| 6,959,077 B1 | 10/2005 | Calhoun et al. | |
| 7,023,825 B1 * | 4/2006 | Haumont et al. | 370/338 |
| 7,075,932 B2 | 7/2006 | Matsuhira et al. | |
| 7,194,078 B2 | 3/2007 | Stumer | |
| 2001/0004354 A1 | 6/2001 | Jolitz | |
| 2002/0131362 A1 * | 9/2002 | Callon | 370/216 |
| 2005/0185654 A1 * | 8/2005 | Zadikian et al. | 370/395.21 |
| 2005/0286705 A1 | 12/2005 | Contolini et al. | |
| 2008/0049629 A1 | 2/2008 | Morrill | |
| 2008/0225733 A1 | 9/2008 | Hua et al. | |
| 2010/0142369 A1 | 6/2010 | Gottwerth et al. | |

OTHER PUBLICATIONS

USPTO, "Final Office Action," issued in connection with U.S. Appl. No. 12/330,366, on Oct. 14, 2010 (17 pages).
USPTO, "Office Action," issued in connection with U.S. Appl. No. 12/330,366, on May 5, 2011 (17 pages).
USPTO, "Final Office Action," issued in connection with U.S. Appl. No. 12/330,366, on Oct. 5, 2011 (18 pages).
USPTO, "Office Action," issued in connection with U.S. Appl. No. 12/330,366, on Feb. 29, 2012 (17 pages).
USPTO, "Notice of Allowance," issued in connection with U.S. Appl. No. 12/330,366, on Aug. 15, 2012 (10 pages).

* cited by examiner

SYSTEMS AND METHODS TO REROUTE INTERNET PROTOCOL TRAFFIC BASED ON NETWORK USER PREFERENCES

RELATED APPLICATION(S)

This patent arises from a continuation of U.S. application Ser. No. 12/330,366, entitled "SYSTEMS AND METHODS TO REROUTING INTERNET PROTOCOL TRAFFIC BASED ON NETWORK USER PREFERENCES" and filed on Dec. 8, 2008, which is hereby incorporated by reference in its entirety.

FIELD OF THE DISCLOSURE

This disclosure relates generally to Internet Protocol (IP) traffic and, more particularly, to systems and methods to reroute IP traffic based on network user preferences.

BACKGROUND

Internet access has become an integral part of life for nearly all residences and businesses. For some businesses a service disruption can create issues, impacting earnings, customer relations, services, operations, productivity, and market value. The impact of a service disruption on a business ranges from a minor inconvenience to an inability to perform business tasks. Service disruptions may result from physical layer failures including, for example, bent fibers, disconnected fibers, transceiver failures, distortion, jitter, wander, high power level, chromatic dispersion, interface card failures, interference, short circuits, loss of light in fibers, or sliced cabling. These service disruptions are known as layer 1 defects.

DETAILED DESCRIPTION

Figure 1:
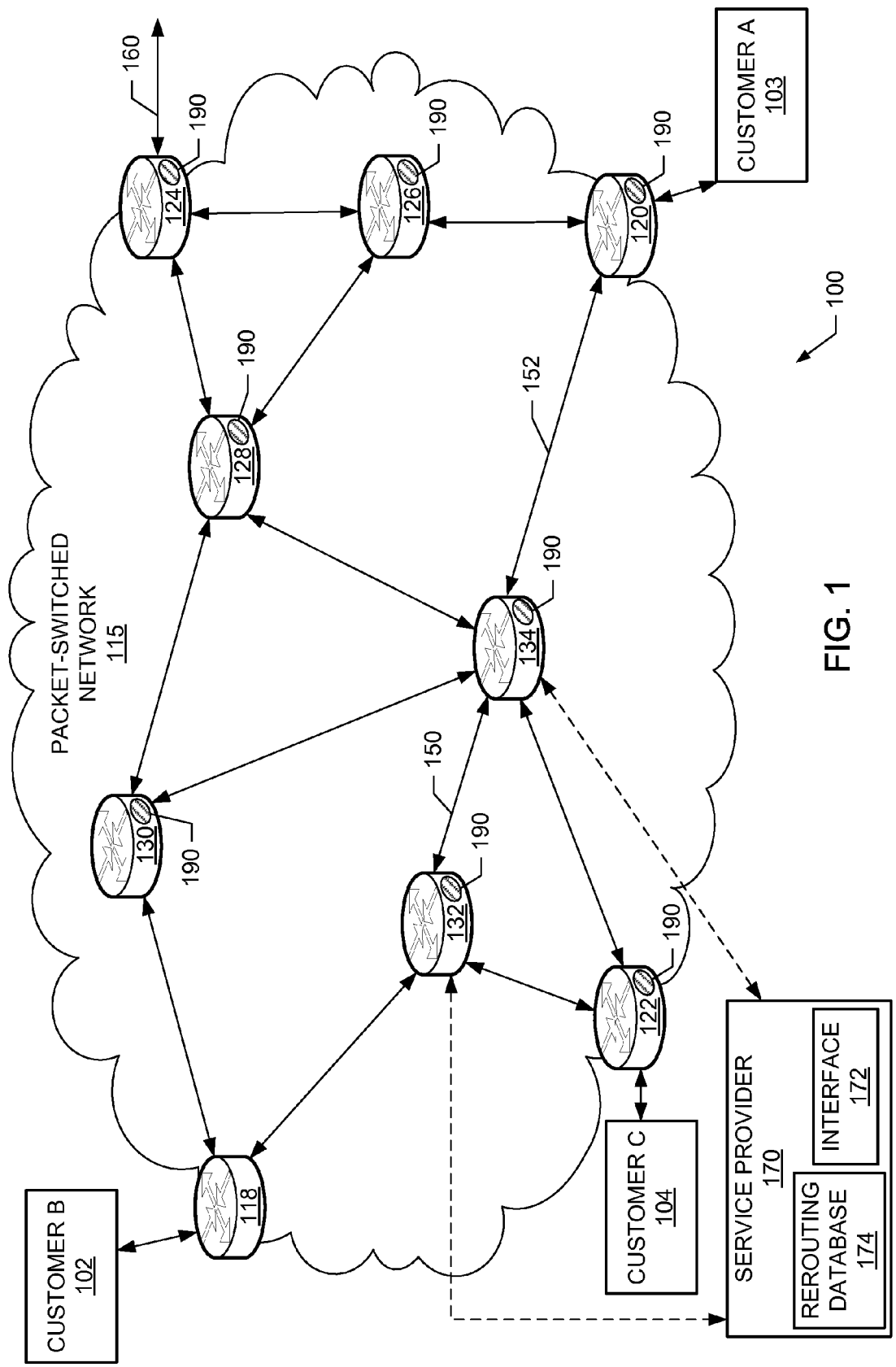
FIG. 1 is a schematic diagram showing an example communication system including routers having layer 1 defect managers constructed in accordance with the teachings of this disclosure.

Example systems, apparatus, and methods to reroute Internet Protocol (IP) traffic based on service level agreements are disclosed. A disclosed example method includes detecting a network defect in a first communication path and receiving IP traffic associated with a network user at a router, wherein the IP traffic is to be routed by the router over the first communication path. The example method further includes buffering the IP traffic associated with the network user during a first time period having a first duration specified by the network user.

A disclosed example apparatus includes a defect detector to detect a network defect on a first communication path and a defect counter to begin counting upon detection of the network defect. The disclosed example apparatus also includes a reroute processor to determine when a count of the defect counter exceeds a first threshold defined by a network user and after the count exceeds the first threshold, to update a routing table to reroute IP traffic associated with the network user from the first communication path to a second communication path.

While the example systems and methods disclosed herein describe rerouting of IP traffic in response to layer 1 defects, the examples disclosed herein may also be used to reroute IP traffic in response to any number and/or type(s) of additional and/or alternative network defects, hardware failures, and/or defects in layers 2-7 of the Open Systems Interconnection (OSI) protocol. Layer 1 is defined as the physical medium used to transport IP traffic between hardware devices, such as routers and/or network switches. A layer 1 defect includes any impairment(s) of the physical medium that prevent the relatively error-free decoding of packets by hardware devices. Causes of layer 1 defects include, for example, bent fibers, disconnected fibers, transceiver failures, distortion, jitter, wander, high power level, chromatic dispersion, interface card failures, interference, short circuits, loss of light in fibers, sliced cabling, and/or any other layer 1 defect.

Moreover, while the following describe example systems that include, among other components, software executed on hardware, such systems are merely illustrative and should not be considered as limiting. For example, it is contemplated that any or all of the disclosed hardware and/or software components could be embodied exclusively in dedicated hardware, exclusively in software, exclusively in firmware and/or in any combination of hardware, firmware, and/or software.

Traditionally, service providers have implemented non-network user specific methods to reroute Internet Protocol (IP) traffic in response to layer 1 defects. For example, when a layer 1 defect occurs, one or more provisioned values in the affected router(s) determine how long to keep associated interfaces and/or line protocols in service before rerouting the IP traffic. When rerouting is performed, it affects all network users in substantially the same way without regarding the network user preferences. While such a solution is acceptable to some business customers (e.g., network users), it may not be acceptable to other business customers. For example, some business customers may want IP traffic to be rerouted immediately upon detection of a layer 1 defect. However, because the rerouting of IP traffic can take 30 seconds or longer, other customers may prefer that a router wait a predefined time period after a layer 1 defect is detected before deciding to reroute IP traffic. The determination of which circumstances should trigger a reroute can be complex, and each customer may desire different rerouting actions given the same set of layer 1 defects. For example, different business customers may operate different network protocols and/or have different overall network management objectives for their IP traffic. For example, a business customer providing Voice over IP (VoIP) services generally cannot tolerate delays while waiting to determine whether to reroute IP data. For purposes of discussion herein, the terms network user and customer are used interchangeably.

An example business customer executing stock trades may specify a relatively short time period for rerouting upon a layer 1 defect and a relatively long time period for continuing to reroute IP traffic after the layer 1 defect is corrected and/or removed. This configuration ensures that the stock trade transactions reach their destination(s) as quickly as possible and only returns to the original route(s) when there is a high probability that the layer 1 defect is corrected and will likely not reoccur. Alternatively, another example business customer with secure and/or confirmed transactions may set a relatively longer time period upon detecting a layer 1 defect before rerouting occurs, and a relatively shorter time period for continuing to reroute IP traffic after the layer 1 defect is cleared. Such a configuration minimizes rerouting of the secure transactions by only rerouting if the layer 1 defect causes the link to be down for a significant time period.

The example system and methods described herein enable each customer to specify how they want their associated IP traffic rerouted when a layer 1 defect occurs. In some examples, the customers specify their IP traffic rerouting preferences within a service level agreement with a service provider. The service provider is an entity or organization that provides Internet services to subscribing customers. An example service level agreement defines a duration to wait before rerouting the customer's IP traffic (which may be referred to as a defect counter value), a path used to reroute their IP traffic, and a duration to continue rerouting their IP traffic after the original layer 1 defect has been rectified (which may be referred to as a clear counter value). Additionally, customers may specify one or more rerouting parameters related to particular IP addresses, IP address ranges, virtual local area networks (VLANs), and/or wide area networks (WANs). In such examples, the rerouting preferences of each customer are stored in a rerouting preferences table. The rerouting preferences table is distributed to routers within the network. When a layer 1 defect is detected, the affected router(s) use the data in the rerouting preferences table to reroute customer IP traffic accordingly to customer specific preferences.

Additionally or alternatively, rerouting can be performed based on one or more type of service (ToS) precedence bits contained in IP headers. The ToS precedence bit definitions can be used to define, select, and/or specify customer specific rerouting preferences. Accordingly, IP headers associated with a particular customer can include the ToS precedence bits assigned to that customer. When a layer 1 defect is detected, the affected router(s) use the value of the ToS precedence bits to determine when and/or how to reroute affected the IP traffic.

FIG. 1 is a schematic illustration of a communication system 100 including an example packet-switched communication network 115. The example communication system 100 also includes a service provider 170 and any number of customer locations, three of which are designated at references 102-104. The service provider 170 and the customers 102-104 are communicatively coupled to the packet-switched communication network 115. The example packet-switched communication network 115 of FIG. 1 implements one or more communication services between, for, and/or amongst the service provider 170 and the customer locations 102-104 such as, for example, a transparent local area network (TLAN) service, a VLAN service, a dedicated internet access (E-DIA) service, a WAN, and/or a virtual private local area network service (VPLS). The example packet-switched communication network 115 may encompass a site, a location, a building, a city, a metropolitan area, a geographic area, and/or a geographic region. Additionally, the packet-switched communication network 115 may provide data communication service to a plurality of customer locations not shown. Some or all of the packet-switched communication network 115 may be implemented by the Internet and/or proprietary network(s).

The example customer locations 103-104 of FIG. 1 may subscribe to the same of different levels of service. For instance, the example customer locations 103 and 104 of FIG. 1 have service level agreements that define the rerouting of their IP traffic while the example customer location 102 does not have a rerouting service level agreement.

The example service provider 170 of FIG. 1 manages the example packet-switched communication system 115 and/or controls access to the example packet-switched communication network 115 from customer locations 102-104. Furthermore, the example service provider 170 manages and/or distributes rerouting requirements and/or parameters to routers 120-134 as specified by customers associated with the customer locations 103 and 104 in their respective service level agreements. An example manner of implementing the example service provider 170 of FIG. 1 is described below in connection with FIG. 3.

To enable customers to specify rerouting preferences, the example service provider 170 of FIG. 1 includes any number and/or type(s) of interfaces, one of which is designated at reference numeral 172. The example interface 172 of FIG. 1 enables the customer locations 103 and 104 to specify their rerouting preferences. An example interface 172 includes a web-based website interface that enables customers associated with the customer locations 103 and 104 to specify durations to wait before rerouting IP traffic upon detecting a layer 1 defect. Such durations are measured by "defect counters" and referred to herein as "defect counter thresholds." Customers associated with the customer locations 103 and 104 may also specify durations to continue rerouting IP traffic upon the correction of the layer 1 defect. Such durations are measured by "clear counters" and referred to herein as "clear counter thresholds." Furthermore, customers associated with the customer locations 103 and 104 may specify a reroute path, a maximum number of hops for rerouting, and/or an IP address domain and/or WAN for IP traffic to reroute. In other examples, the interfaces 172 include a voice response system, a customer service call center, etc.

To store customer specific rerouting preferences, the example service provider 170 of FIG. 1 includes a rerouting database 174. The example rerouting database 174 of FIG. 1 stores the rerouting requirements specified by customers of the customer locations 103 and 104 via the interface 172. As described below in connection with FIGS. 7-8, the example rerouting database 174 may be implemented with data structures having fields for defect counters, defect counter thresholds, clear counters, clear counter thresholds, IP address domains and/or WAN identifiers, and/or any specific rerouting paths. Additionally, the rerouting database 174 may include a field for a precedence bit ToS header value for corresponding customer(s). The service provider 170 may transmit the stored data within the rerouting database 174 to layer 1 defect managers 190 implemented within or otherwise associated with the routers 120-134. The service provider 170 may transmit the data within the rerouting database 174 via the packet-switched communication network 115 periodically to one or more of the routers 120-134 and/or upon instruction from an operator of the service provider 170.

To route data between the example customer locations 102-104 and/or the example service provider 170, the example packet-switched communication network 115 of FIG. 1 includes any number of routers, nine of which are designated at reference numbers 118-134. The example routers 118-122 of FIG. 1 are edge routers, the example routers 126-134 are network routers, and the example router 124 is a border router. The example routers 118-134 are packet-based routers such as, for example, the Catalyst 3000 and/or 5000 series of switches from Cisco Systems, Inc. One or more user devices (not shown) at any of the customer locations 102-104 may be communicatively coupled to the routers 118-122, and used to access and/or utilize data communication services provided and/or implemented by the example packet-switched communication network 115 of FIG. 1.

The example routers 118-134 of FIG. 1 are communicatively coupled via any number and/or type(s) of communication paths, two of which are designated at reference numbers 150 and 152. The communication paths 150 and 152 may be implemented in accordance with any past, present, and/or future protocol(s) (e.g., any past, present, and/or future OSI protocol). In the example of FIG. 1, the communication paths 150 and 152 include a physical medium (e.g., OSI layer 1) such as cabling and/or hardware for physically transporting packets within the packet-switched communication network 115. The example communication paths 150 and 152 also include data link layers, network layers, transport layers, session layers, presentation layers, and/or application layers. The physical layer of the example communication paths 150 and 152 may be implemented using any type(s) and/or number of access device(s), communication technology(-ies), communication link(s) and/or communication network(s) such as, for example, public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks. In some examples, transport layers are implemented in accordance with the Internet Protocol version 4 (IPv4) standard, the Internet Protocol version 6 (IPv6) standard, and/or any other past, present, and/or future IP routing standard.

The example customer locations 102-104 of FIG. 1 are communicatively coupled to the packet-switched communication network 115 via the edge routers 118-122 via any type(s) and/or number of access device(s), communication technology(-ies), communication link(s) and/or communication network(s) such as, for example, PSTN systems, PLMN systems, wireless distribution systems, wired or cable distribution systems, coaxial cable distribution systems, UHF/VHF radio frequency systems, satellite or other extra-terrestrial systems, cellular distribution systems, power-line broadcast systems, fiber optic networks, and/or any combination and/or hybrid of these devices, systems and/or networks. The edge routers 118-122 may be located at a central office (CO), vault, serving area interface (SAI) and/or one or more remote terminal (RT) locations. The example customer locations 102-104 of FIG. 1 may include any of a LAN to couple one or more customer premise equipment (CPEs) to the packet-switched communication network 115, a residential gateway (RG), a wireless LAN, a VoIP device, a router, a switch, an access point, a DSL modem, a cable modem, etc.

The example routers 118-134 of FIG. 1 may experience a layer 1 defect if any of the communication links 150 and 152 and/or hardware (for example, a network interface port or card) within the routers 118-134 becomes nonfunctional and/or partially functional. A layer 1 defect may occur for any period of time (e.g., a few microseconds to a couple of days) depending on the severity and/or type(s) of the defect. For example, a severed cable may require a few days for a service crew to physically replace and/or repair the cable while RF interference may cause a layer 1 defect of a few seconds or less.

If, for example, the cable (communication path) 150 connecting the example router 132 to the example router 134 becomes severed, a layer 1 defect occurs between the two routers 132 and 134. As a result of the broken cable 150, the router 132 cannot send IP traffic to the router 134 and the router 134 cannot send IP traffic to the router 132. As a result of the loss of communication with the router 134, the router 132 deactivates the physical layer, the data layer, and/or other OSI layers used to transport IP traffic between the two routers 132 and 134.

To reroute IP data within the packet-switched communication network 115 in accordance with customer preferences, at least some of the example routers 120-134 of FIG. 1 implement, are associated with, and/or include a layer 1 defect manager 190. In some examples, a router 120-134 may include more than one layer 1 defect manager 190. Additionally, some routers may not include a layer 1 defect manager 190. For instance, in the illustrated example of FIG. 1 the example router 118 does not implement a layer 1 defect manager 190. Additionally or alternatively, in some examples, some of the routers 120-134 may share a single layer 1 defect manager 190. The example layer 1 defect managers 190 of FIG. 1 may be implemented as separate devices communicatively coupled to the routers 120-134, and/or as machine-accessible instructions executed within the routers 120-134. If the layer 1 defect manager 190 is implemented as machine-accessible instructions, the service provider 170 may implement the layer 1 defect managers 190 within the routers 120-134 by installing the layer 1 defect manager 190 into a first router 134 and having the router 134 propagate the machine-accessible instructions to the other routers 120-132. Alternatively, the service provider 170 may install the layer 1 defect manager 190 directly into each of the routers 120-134. Furthermore, the example service provider 170 may update the routers 120-132 with customer rerouting requirements at any desired time (e.g., upon receiving new rerouting requirements from a customer), at certain time(s) (e.g., every Monday at 3:00 P.M.), at certain intervals (e.g., every 12 hours), and/or upon instruction from an operator of the service provider 170. An example manner of implementing the example layer 1 defect manager 190 of FIG. 1 is described below in connection with FIG. 2.

The example layer 1 defect managers 190 of FIG. 1 detect layer 1 defects using diagnostics implemented within the routers 120-134. Example diagnostic capabilities include detecting when a connection with an adjacent router is disrupted and/or detecting when hardware within the router is causing routing errors with adjacent routers. For example, the diagnostic capabilities implemented at the routers 132 and 134 may detect that a socket connecting the communication path 150 to the router 134 is broken. Upon detecting the broken socket, the router 132 may activate and/or log a diagnostic trouble code indicating that communication with the router 134 has been disrupted. Likewise, one or more other router(s) (e.g., the router 134) may activate and/or log a diagnostic trouble code indicating that communication with the router 132 has been disrupted. In response to the detected layer 1 defect, the layer 1 defect managers 190 associated with the routers 132 and 134 perform IP rerouting in accordance with the requirements of the customer locations 103-104 and/or one or more other customer location(s) not shown. As described in more detail below, rerouting may be performed based on IP addresses and/or precedence bits within the ToS headers of IP control bits.

If, for example, the communication link 150 experiences a layer 1 defect, the routers 132 and 134 will be unable to exchange IP traffic, and, thus, the OSI layers between the routers 132 and 134 are deactivated. However, the router 132 remains capable of communicating with the routers 118 and 122, and the router 134 remains capable of communicating with the routers 120, 122, 128, and 130.

Illustratively, the customer location A 103 of the illustrated example has a specified defect counter time of 2500 milliseconds (ms), a clear counter time of 500 ms, and a WAN corresponding to IP addresses in a group ABC. Upon detecting the layer 1 defect along the communication path 150, the example router 132 initializes a diagnostic trouble code indicating that the communication path 150 to the router 134 is defective. Likewise, the router 134 activates a diagnostic trouble code indicating that the communication path 150 to the router 132 is defective. In some examples, such diagnostic trouble codes are sent to the service provider 170. Upon receiving the diagnostic trouble code(s), the service provider 170 may troubleshoot the issue and/or begin a process of correcting the defective communication path 150. Layer 1 defect managers 190 associated with the routers 132 and 134 detect the diagnostic trouble code for the defective connection and begin rerouting IP traffic according to the requirements of the customer locations 103 and 104.

Example customer specified rerouting requirements include, but are not limited to, a defect counter threshold to buffer IP traffic upon detection of a layer 1 defect before rerouting the IP traffic, a clear counter threshold to continue rerouting IP traffic upon correction of the layer 1 defect, a rerouting path, types of layer 1 defects that trigger rerouting IP traffic, domains that are to be rerouted, IP addresses that are to be rerouted, and/or WANs that are to be rerouted. For example, the customer A 103 may specify its defect counter threshold to be 1000 milliseconds (ms), its clear counter threshold to be 3000 ms, and a reroute path through the router 126 if the communication path 152 between the router 120 and the router 134 becomes defective. By specifying a defect counter threshold the customer location A 103 specifies a duration to buffer its IP traffic upon detection of a layer 1 defect. Similarly, by specifying a clear counter threshold the customer location A 103 specifies a duration to continue rerouting its IP traffic upon a correction of the layer 1 defect. In other examples, a customer may specify its defect counter threshold to have a value of zero; meaning the affected router immediately reroutes IP traffic associated with that customer upon detecting a layer 1 defect. Similarly, a customer may specify its clear counter threshold to have a value of zero; meaning the router immediately reverts to the original communication path upon correction of the layer 1 defect. The customer locations 103 and 104 may specify the rerouting requirements in, for example, respective service level agreements with the service provider 170 (e.g., implicitly by specifying the agreements and/or the agreement level and/or explicitly specifying value(s) for inclusion in the agreement). Alternatively, the threshold(s) may be changed at any time by inputting new value(s) (directly or indirectly) with range(s) specified in an underlying service agreement.

In the illustrated example of FIG. 1, customer rerouting preferences and/or requirements are stored in rerouting tables within the example layer 1 defect managers 190. Upon detection of a diagnostic trouble code at a particular layer 1 defect manager 190, the layer 1 defect manager 190 starts a defect counter and begins buffering IP traffic that was to be sent along the affected communication path. The layer 1 defect manager 190 then compares the value of the defect counter to defect counter threshold(s) of one or more customer(s) affected by the layer 1 defect. When the defect counter reaches the defect counter threshold for a particular customer 103 or 104, the example layer 1 defect manager 190 of FIG. 1 updates the forwarding and/or routing tables of the respective router(s) associated with the layer 1 defect manager 190. The routing tables are updated with respect to the customer associated with the defect counter threshold. Updating the routing tables causes the router(s) to begin rerouting the buffered IP traffic associated with that customer location. For example, if the communication path 150 becomes defective, the router 132 reroutes the buffered IP traffic by sending the IP traffic to the router 118, which then routes the IP traffic to the router 130. The router 130 may then route the IP traffic to the router 134 or the router 128 depending on the destination of the IP traffic.

Upon correction of a layer 1 defect, the affected router(s) may clear their diagnostic trouble code associated with the layer 1 defect. Correspondingly, the affected layer 1 defect mangers 190 associated with the affected routers detect the correction of the layer 1 defect and start respective clear counter(s). The layer 1 defect manager 190 then compares the value of the clear counter to clear counter threshold(s) of one or more customer(s) affected by the layer 1 defect. When the clear counter at a particular layer 1 defect manager reaches the clear counter threshold specified by a particular customer, the layer 1 defect manager 190 updates the forwarding and/or routing tables of the router(s) associated with the layer 1 defect manager 190 so that IP traffic for that customer location can be rerouted along the original communication path.

Additionally or alternatively, the customer location A 103 may be assigned a precedence bit value of '010' that corresponds to a defect counter threshold of 2500 ms and a clear counter threshold of 500 ms. The customer location 104 be assigned a precedence bit value of '110' that corresponds to a defect counter threshold of 250 ms and a clear counter threshold of 15000 ms. Devices at the customer location 103 and/or border controllers associated with the service provider 170 may insert the '010' precedence bit value into the ToS IP header of IP data packets associated with the customer location 103. Similarly, devices at the customer location 104 and/or border controllers associated with the service provider 170 may insert the '110' precedence bit value into the ToS IP header of IP data packets associated with the customer location 104.

When a layer 1 defect occurs, the layer 1 defect manager(s) 190 associated with the routers 132 and 134 affected by the defect use the precedence bit value in the ToS header of the buffered IP traffic to determine whether to reroute the IP traffic. For example, the layer 1 defect managers 190 can cross-reference the precedence bit value of '010' via a table specifying the defect counter threshold of 2500 ms, the clear counter threshold of 500 ms, and/or a reroute path for the customer location A 103. Thus, upon the detection of a layer 1 defect, the layer 1 defect managers 190 start the defect counter and compare the value of the defect counter to defect counter threshold(s) of one or more customer(s) affected by the layer 1 defect. When the defect counter reaches the defect counter threshold of 2500 ms, the example layer 1 defect managers 190 update the forwarding and/or routing tables with the precedence bit value '010' and the corresponding reroute path. Updating the routing tables causes the router(s) to begin rerouting the buffered IP traffic associated with that precedence bit value '010' (e.g., the customer location A 103). Additionally, upon a detection of a correction of the layer 1 defect, the layer 1 defect managers start the clear counter and compare the value of the clear counter to clear counter threshold(s) of one or more customer(s) affected by the layer 1 defect. When the clear counter reaches the clear counter threshold of 500 ms, the example layer 1 defect managers 190 update the forwarding and/or routing tables with the precedence bit value '010'. Updating the routing tables causes the router(s) to begin routing the IP traffic associated with that precedence bit value '010' along the original communication path.

While an example manner of implementing the communication system 100 is depicted in FIG. 1, one or more of the interfaces, data structures, elements, processes and/or devices illustrated in FIG. 1 may be combined, divided, rearranged, omitted, eliminated and/or implemented in any other way. For example, the example packet-switched communication network 115, the example routers 118-134, the example layer 1 defect managers 190, the example interface 172, the example rerouting database 174, and/or the example service provider 170 illustrated in FIG. 1 may be implemented separately and/or in any combination using, for example, machine-accessible or readable instructions executed by one or more computing devices and/or computing platforms (e.g., the example processing platform P100 of FIG. 13). Further, the example packet-switched communication network 115, the example routers 118-132, the example layer 1 defect managers 190, the example interface 172, the example rerouting database 174, the example service provider 170, and/or more generally, the communication system 100 may be implemented by hardware, software, firmware and/or any combination of hardware, software and/or firmware. Thus, for example, any of the example packet-switched communication network 115, the example routers 118-134, the example layer 1 defect managers 190, the example service provider 170, the example interface 172, the example rerouting database 174, and/or more generally, the communication system 100 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example packet-switched communication network 115, the example routers 118-132, the example layer 1 defect managers 190, the example service provider 170, the example interface 172, and/or the example rerouting database 174 are hereby expressly defined to include a tangible medium such as a memory, a digital versatile disc (DVD), a compact disk (CD), etc. to store the software and/or firmware. Further still, the example communication system 100 may include additional devices, servers, systems, networks, gateways, portals, and/or processors in addition to, or instead of, those illustrated in FIG. 1 and/or may include more than one of any or all of the illustrated devices, servers, networks, systems, gateways, portals, and/or processors.

Figure 2:
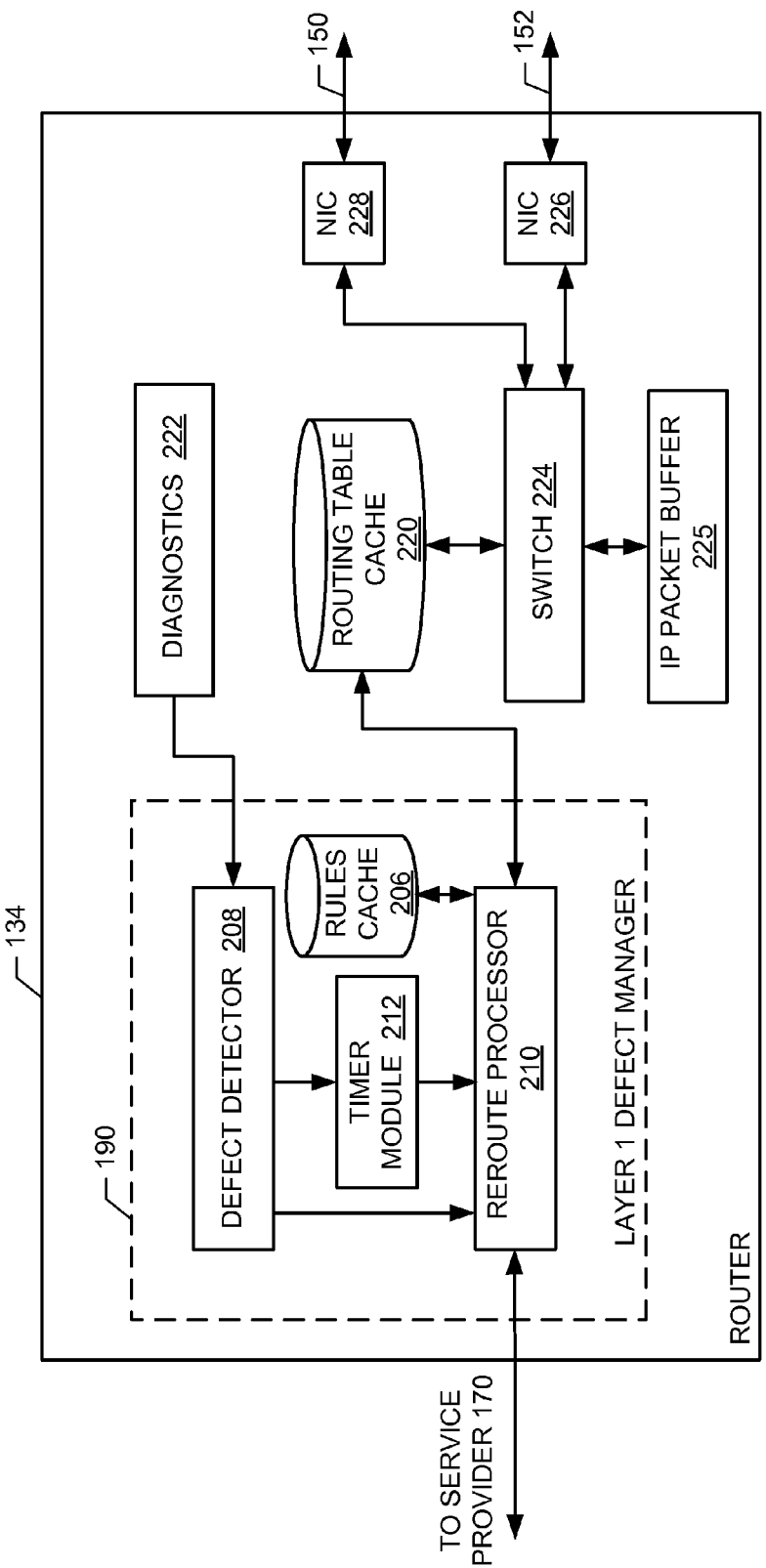
FIG. 2 illustrates an example manner of implementing a layer 1 defect manager for the example communication system of FIG. 1.

FIG. 2 illustrates an example manner of implementing the example layer 1 defect managers 190 of FIG. 1. While the example layer 1 defect manager 190 of FIG. 2 is shown with reference to the example router 134, layer 1 defect managers 190 may be implemented similarly by the routers 120-132. While the example layer 1 defect manager 190 is implemented by the example router 134, the layer 1 defect manager 190 may be implemented separately from the router 134 and communicatively coupled to the router 134 and/or to one or more routers 120-132.

The example router 134 of FIG. 2 receives and/or transmits IP traffic via any number and/or type(s) of network interface cards (NICs), two of which are designated at reference numerals 226 and 228. The router 134 may include additional NICs not shown. The NICs 226 and 228 provide a layer 1 physical connection to respective communication paths and example layer 2 data link connections to the packet-switched communication network 115. The example NIC 226 is associated with the communication path 150 and the example NIC 228 is associated with the communication path 152. The NICs 226 and 228 may be implemented in accordance with any past, present, and/or future standard, specification, and/or recommendation including the Internet Engineering Task Force (IETF), the IEEE and/or the International Telecommunication Union (ITU).

To switch data between the example NICs 226 and 228, the example router 134 of FIG. 2 includes any number and/or type(s) of switches, one of which is designated at reference numeral 224. The example NICs 226 and 228 forward IP traffic to and receive IP traffic from the example switch 224. The example switch 224 of FIG. 2 determines the forwarding path of received IP traffic and forwards the IP traffic to the appropriate destination. The example switch 224 accesses forwarding and/or routing tables stored in a routing table cache 220.

To buffer IP packets and/or IP traffic, the example router 134 of FIG. 2 includes an IP packet buffer 225. The example IP packet buffer 225 stores IP packets that cannot be routed due to a layer 1 defect. Upon determining IP packets cannot be routed due to a layer 1 defect, the example switch 224 stores and/or buffers the affected IP packets in the IP packet buffer 225. The IP traffic is buffered in the IP packet buffer 225 until forwarding and/or routing tables are updated with a new path. In response to updating the routing tables, the example switch 224 reroutes the IP packets buffered in the IP packet buffer 225 associated with the updated routing tables. The example IP packet buffer 225 may be implemented by any random-access memory (RAM) or read-only memory (ROM).

To reroute customer IP traffic upon the occurrence of a layer 1 defect and in accordance with customer preferences, the example router 134 of FIG. 2 includes the example layer 1 defect manager 190. The example layer 1 defect manager 190 of FIG. 2 manages the rerouting of IP traffic by updating the forwarding and/or routing tables stored within the routing table cache 220.

To detect when layer 1 defects occur, the example layer 1 defect manager includes a defect detector 208. The example layer 1 defect detector 208 of FIG. 2 receives parameters and/or values representative of the status of the communication paths 150 and 152 and/or the corresponding NICs 226 and 228 from, for example, a diagnostics module 222 implemented by the router 134. The example diagnostics module 222 of FIG. 2 detects layer 1 defects in the communication paths 150 and 152 and/or within the NICs 226 and 228 using any number and/or type(s) of method(s), logic, rule(s), and/or technique(s). When a layer 1 defect is detected, the example defect detector 208 of FIG. 2 starts a defect counter. Similarly, when a correction of a layer 1 defect is detected, the example defect detector 208 starts a clear counter. Additionally, the defect detector 208 notifies a reroute processor 210 of the detected layer 1 defect and/or a correction of the layer 1 defect.

To implement the defect counter and/or the clear counter, the example layer 1 defect manager 190 of FIG. 2 implements a timer module 212. The example timer module 212 of FIG. 2 implements a plurality of defect counters and a plurality of clear counters for a plurality of respective layer 1 defects. That is, the timer module 212 maintains a defect counter for each detected layer 1 defect. For example, a router with 128 paths may have detected 15 paths with layer 1 defects. The timer module 212 maintains 15 defect counters, each one starting when the corresponding layer 1 defect was detected and incrementing until the defect is resolved in order to measure the time since the corresponding defect was detected. Upon receiving an indication of a particular layer 1 defect from the example defect detector 208, the example timer module 212 of FIG. 2 starts a corresponding defect counter. The timer module 212 sends periodic messages to the reroute processor 210 indicating the elapsed time since the defect was detected. For example, the timer module 212 may send the example reroute processor 210 a message every 50 ms indicating whether a particular layer 1 defect is continuing. Alternatively, the reroute processor 210 may request the current count of the defect counter(s) periodically or as needed.

Upon receiving an indication that a particular layer 1 defect has been resolved, the example timer module 212 of FIG. 2 starts a corresponding clear counter and increments the clear counter until customer IP traffic affected by the layer 1 defect is routed along the original path in order to measure the time since the detection of the correction of the corresponding layer 1 defect. Also, upon detecting the correction of the layer 1 defect, the timer module 212 stops the defect counter associated with that layer 1 defect and sends a message to the example reroute processor 210 with the final time of the defect counter. The example timer module 212 of FIG. 2 sends periodic messages to the reroute processor 210 with the elapsed time since each layer 1 defect was resolved. Alternatively, the reroute processor 210 may request the current count of the clear counter(s) periodically or as needed.

Figure 4:
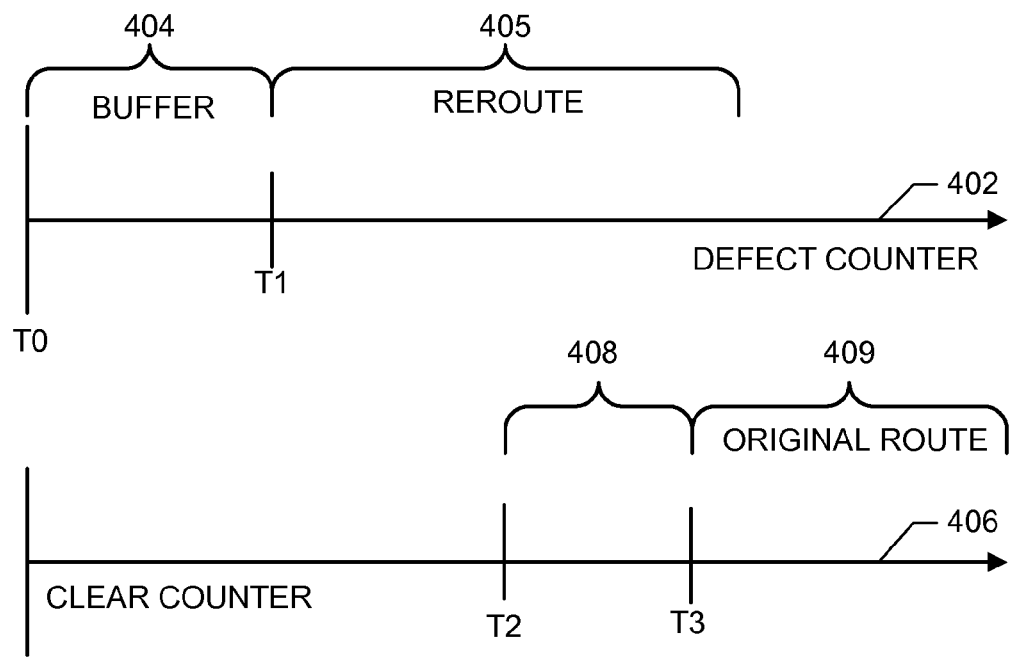
FIG. 4-6 show example operations of defect counters and example clear counters for the example layer 1 defect manager of FIG. 2.

FIG. 4 illustrates the operation of an example defect counter and an example clear counter. The counters 402 and 406 may be implemented by the timer module 212 of FIG. 2. The example defect counter includes a defect counter timeline 402 and the example clear counter includes a clear counter timeline 406 with time scales in the milliseconds.

The example defect counter timeline 402 is used by the layer 1 defect manager 190 of FIG. 2 to count the elapsed time from the time the layer 1 defect manager 190 detects a particular layer 1 defect. When the defect counter reaches a count corresponding to a time T1 specified by a customer to begin rerouting their IP traffic, rerouting is initiated for that customer. In the example of FIG. 4, a line labeled T0 at 0 ms indicates the time at which the layer 1 defect was detected by the layer 1 defect manager 190. The line labeled T1 is a time threshold specified by a customer to reroute their IP traffic. During a time period 404 between T0 and T1, the example router 134 of FIG. 2 buffers IP traffic for the customer. When the defect counter reaches a count corresponding to time T1, IP traffic associated with the customer is rerouted (e.g., during a time period 405). The customer may specify the value of T1 to be at any point along the defect counter timeline 402 including 0 ms. If the line T1 is specified to be 0 ms, the layer 1 defect manager 190 reroutes IP traffic associated with the customer upon detecting the layer 1 defect.

The example layer 1 defect manager 190 uses the clear counter to count the elapsed time from a time T2 when correction of the layer 1 defect was detected to a time threshold T3 when the layer 1 defect manager 190 begins routing customer IP traffic along the original path. During a time period 408 after correction of the layer 1 defect, the router 134 continues rerouting the customer's IP traffic. When the clear counter reaches a count corresponding to time T3 the router 134 reverts to routing of the customer's IP traffic along the original path during a time period 409.

Different customers can specify different points along the defect counter timeline 402 and/or the clear counter timeline 406, as shown in FIG. 4. Additionally, a single customer may specify different points along the defect counter timeline 402 and/or the clear counter timeline 406 for different business units, different WANs, different groups of IP addresses, different type(s) of defects, etc. If a layer 1 defect is corrected then immediately occurs again, the defect counter and the clear are reset to 0 ms. A separate counter may track such repeated short term cycling between defects and corrections and may adjust the thresholds when a number of cycles occur within a given time period to avoid repeated service interruptions.

Figure 5:
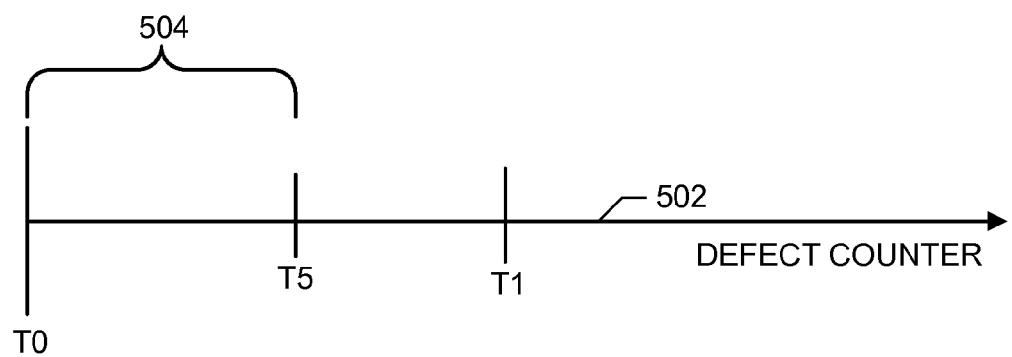

FIG. 5 shows an example defect counter timeline 502 with a line T1 indicating the time at which the layer 1 defect manager 190 of FIG. 2 begins rerouting IP traffic associated with a customer after detecting a layer 1 defect. A line T5 indicates a time when the defect is corrected. Because the layer 1 defect was corrected before the time threshold indicated by line T1 and specified by the customer, the IP traffic associated with the customer is not rerouted. Additionally, upon detecting the correction of the layer 1 defect at time T5, the router 134 routes the IP traffic associated with the customer that was buffered during a time period 504.

Figure 6:
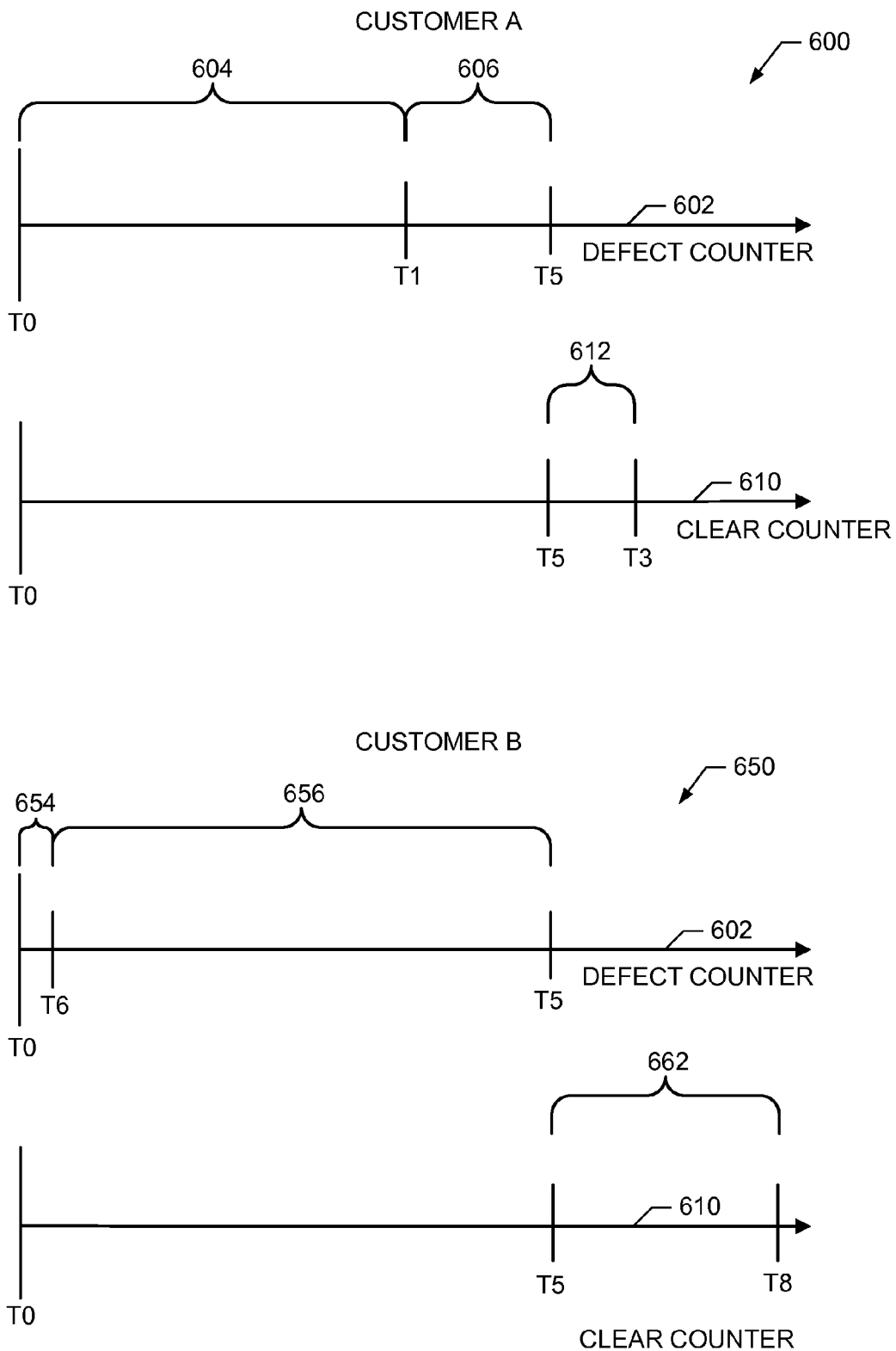

FIG. 6 shows examples of routing requirements 600 and 650 specified by a customer A and a customer B, respectively. The routing requirements 600 are reflected on a defect counter timeline 602 with a defect counter threshold of T1, and a clear counter timeline 610 with a threshold of T3. The routing requirements 650 are reflected on a defect counter timeline 602 with a defect counter threshold of T6 and a clear counter threshold of T8.

The customer A and the customer B are shown with different respective rerouting requirements 600 and 650. The defect counter threshold (e.g., line T1) for customer A is set to 2000 ms while the defect counter threshold (e.g., line T6) for customer B is set to 100 ms. Thus, customer A has a buffering time period 604 of 2000 ms and customer B has a buffering time period 654 of 100 ms. The layer 1 defect manager 190, upon detecting a layer 1 defect at time T0, reroutes the IP traffic of customer A at a time T1 (e.g., (2000 ms) while rerouting the IP traffic of customer B at a time T6 (e.g., 100 ms).

At a time T5 the defect counter detects the layer 1 defect has been corrected. In this example, time T5 occurs 2500 ms after the occurrence of the layer 1 defect was detected. At this time T5, the clear counter starts. The clear counter threshold (represented by line T3) for customer A is specified by the customer A for 300 ms while the clear counter threshold (represented by line T8) for customer B is specified for 750 ms. The layer 1 defect manager 190, upon detecting the correction of the layer 1 defect at time T5, routes the IP traffic of customer A along the original path until time T3 (e.g., 300 ms after the correction of the layer 1 defect was detected at time T5). In a similar manner, the layer 1 defect manager routes the IP traffic of customer B along the original path until time T8 (e.g., 750 ms after the correction of the layer 1 defect at time T5).

Returning to FIG. 2, to store the customer rerouting requirements, the example layer 1 defect manager 190 of FIG. 2 includes a rules cache 206. The example rules cache 206 of FIG. 2 stores rerouting information including, but not limited to, defect counter thresholds, clear counter thresholds, next hop path information, and/or the corresponding customer IP addresses, WANs, and/or domains. Furthermore, the example rules cache 206 may store precedence bit values and/or the association of precedence bit values to defect counter thresholds and/or clear counter thresholds.

The example rules cache 206 of FIG. 2 is updated based on rerouting requirements received from the service provider 170 of FIG. 1. Rerouting requirements and/or new rerouting requirements updates may be received periodically, at specific times, and/or at the discretion of the service provider 170. Upon receiving the rerouting requirements, the example reroute processor 210 of FIG. 2 updates the rules cache 206 and/or the routing table cache 220. Rerouting requirements may be organized based on IP addresses, customers, path, precedence bit values, defect counter time, and/or clear counter time. Example data structures that may be used to implement the example rules cache 206 of FIG. 2 are described below in connection with FIGS. 7-9. The example rules cache 206 may be stored in any number and/or types of memory(ies) and/or memory devices.

To manage the rerouting of customer IP traffic during a layer 1 defect, the example layer 1 defect manager 190 includes the example reroute processor 210. The example reroute processor 210 of FIG. 2 receives indications of layer 1 defects and/or indications of corrections of a layer 1 defect from the example defect detector 208. Upon receiving an indication of a layer 1 defect, the reroute processor 210 accesses the rules cache 206 to obtain customer specified defect counter thresholds. Then, as the timer module 212 provides the elapsed time since the detected layer 1 defect, the reroute processor 210 compares the elapsed time to the defect counter thresholds of each customer. When the elapsed time of the layer 1 defect reaches a defect counter threshold of a particular customer, the example reroute processor 210 of FIG. 2 uses data stored in the rules cache 206 for that customer to update forwarding and/or routing tables within the routing table cache 220. The rerouting information obtained from the rules cache 206 may include a next hop path for that customer and/or an indication of whether to reroute IP traffic for that particular customer. During the layer 1 defect, the switch 224 buffers the IP traffic destined for the communication path with the layer 1 defect. When the forwarding and/or routing tables within the routing table cache 220 are updated by the example reroute processor 210, the switch 224 can begin rerouting the IP traffic associated with that customer via another communication path. The switch 224 continues rerouting the IP traffic for this customer until the routing tables in the routing table cache 220 are updated.

Upon the correction of a layer 1 defect, the example reroute processor 210 of FIG. 2 receives an indication from the example defect detector 208 and/or updates of elapsed time since the correction of the layer 1 defect from the example timer module 212. After receiving the indication of the correction of the layer 1 defect, the example reroute processor 210 accesses the rules cache 206 for the customer specified clear counter thresholds. When the elapsed time of the clear counter reaches the customer specified clear counter thresholds, the example reroute processor 210 sends updates to the routing tables within the example routing table cache 220. The update may include the IP addresses and/or WAN of the customer and/or instructions that route the IP traffic for that customer back to the original communication path. In response to the update to the routing tables, the example switch 224 changes the routing of the IP traffic associated with the customer from the reroute path back to the original path.

Additionally or alternatively, the example service provider 170 assigns a ToS precedence bit value to customers to facilitate the rerouting of their IP traffic. The service provider 170 may assign a different precedence bit value to each customer or the same precedence bit value to customers with similarly defined thresholds. In some examples, customer devices add their associated precedence bit value to their IP data packets. The example reroute processor 210 of FIG. 2 manages the definitions of the precedence bit values corresponding to each customer by storing and/or updating the precedence bit values in routing tables within the rules cache 206. Upon an occurrence of a layer 1 defect and a defect counter reaching a customer specified defect counter threshold, the reroute processor 210 updates the routing tables by specifying a reroute path for the customer's IP traffic based on the precedence bit value associated with the customer. As a result of updating the routing tables, the switch 224 determines which IP traffic currently being buffered has a ToS IP header with that precedence bit value and begins rerouting the customer's IP traffic based on the defect counter threshold and clear counter threshold associated with that precedence bit value.

In yet another example, the example routing table cache 220 of FIG. 2 may be indexed based on precedence bit values. In such instances, the reroute processor 210 can manage the updating and addition of the precedence bit values in the routing tables in the routing table cache 220. Then, as the example switch 224 buffers IP traffic upon the occurrence of a layer 1 defect, the switch 224 reads the value in the precedence bit value in the ToS header of the IP data packets to determine how to reroute the IP traffic.

In addition to managing the rerouting of customer IP traffic, the example reroute processor 210 of FIG. 2 manages the rerouting requirements for each customer. The example reroute processor 210 may receive rerouting requirements and/or updates of rerouting requirements from the service provider 170. Upon receiving the rerouting requirements, the example reroute processor 210 stores and/or updates the rerouting requirements stored in the example rules cache 206.

In addition to any number and/or type(s) of specialized hardware, firmware and/or logic to perform processing functions, the example reroute processor 210 of FIG. 2 may include any number and/or type(s) of specialized and/or general purpose controller(s) and/or processing unit(s) capable of executing coded instructions. For example, a controller and/or processing unit may perform any number and/or type(s) of processing functions by carrying out and/or executing coded instructions present in a memory communicatively coupled to and/or implemented within the reroute processor 210 (e.g., within a RAM, a ROM and/or on-board memory of the reroute processor 210).

While an example manner of implementing the example router 134 of FIG. 1 is depicted in FIG. 2, one or more of the interfaces, data structures, elements, processes and/or devices illustrated in FIG. 2 may be combined, divided, rearranged, omitted, eliminated and/or implemented in any other way. For example, the example layer 1 defect manager 190, the example rules cache 206, the example defect detector 208, the example timer module 212, the example reroute processor 210, the example diagnostics module 222, the example routing table cache 220, the example switch 224, the example IP packet buffer 225, and/or the example NICs 226 and 228 and/or more generally the example router 134 of FIG. 2 may be implemented separately and/or in any combination using, for example, machine-accessible instructions executed by one or more computing devices and/or computing platforms (e.g., the example processing platform P100 of FIG. 13). Further, the example layer 1 defect manager 190, the example rules cache 206, the example defect detector 208, the example timer module 212, the example reroute processor 210, the example diagnostics module 222, the example routing table cache 220, the example switch 224, the example IP packet buffer 225, the example NICs 226 and 228 and/or, more generally, the example router 134 may be implemented by hardware, software, firmware and/or any combination of hardware, software and/or firmware. Thus, for example, any of the example layer 1 defect manager 190, the example rules cache 206, the example defect detector 208, the example timer module 212, the example reroute processor 210, the example diagnostics module 222, the example routing table cache 220, the example switch 224, the example IP packet buffer 225, the example NICs 226 and 228 and/or, more generally, the router 134 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software or firmware implementation, at least one of the example layer 1 defect manager 190, the example rules cache 206, the example defect detector 208, the example timer module 212, the example reroute processor 210, the example diagnostics module 222, the example routing table cache 220, the example switch 224, the example IP packet buffer 225, the example NICs 226 and 228, and/or more generally, the example router 134 are hereby expressly defined to include a tangible medium such as a memory, DVD, CD, etc. to store the software or firmware. Further still, the example router 134 may include additional devices, servers, systems, networks, gateways, portals, and/or processors in addition to, or instead of, those illustrated in FIG. 2 and/or may include more than one of any or all of the illustrated devices, servers, networks, systems, gateways, portals, and/or processors.

Figure 3:
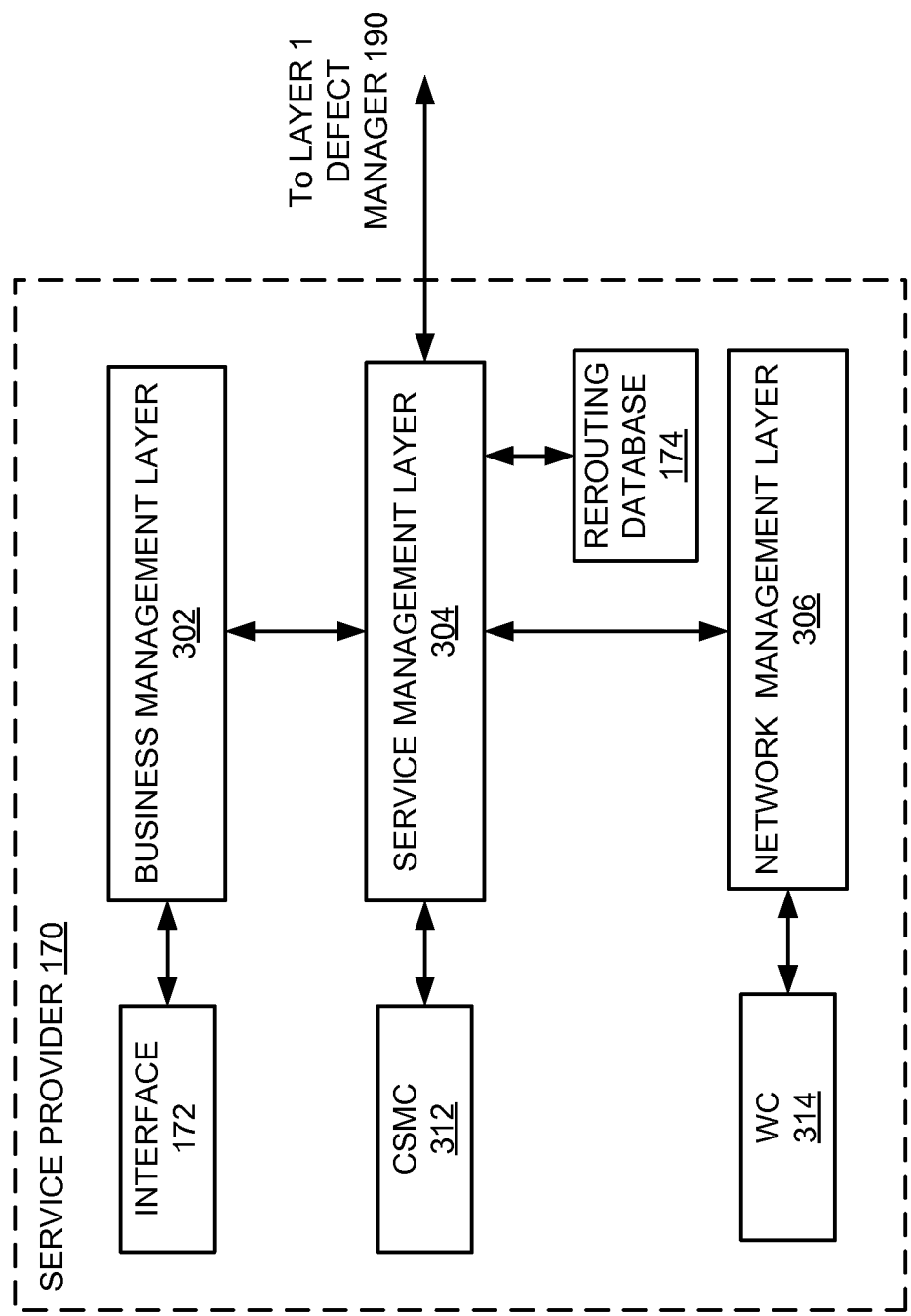
FIG. 3 illustrates an example manner of implementing a service provider for the communication system of FIG. 1.

FIG. 3 illustrates an example manner of implementing the example service provider 170 of FIG. 1. The example service provider 170 of FIG. 3 is shown with structures to manage customer service level agreements that specify how to reroute IP traffic in response to layer 1 defects. Additionally, the example service provider 170 may include structures to manage the packet-switched communication network 115 of FIG. 1 to provide services to customers, to provide network security, to provide application management, and/or to implement any other functions typically provided by a service provider. The operation of the service provider 170 is organized as a series of layers. The purpose of each layer is to provide services to the next higher layer.

To record customer service information, the example service provider 170 includes a business management layer 302. The example business management layer 302 of FIG. 3 is used for sales, marketing, order entry, accounting, billing management, and/or control functions. The example business management layer 302 is communicatively coupled to the example interface 172 of FIG. 1 that provides various sales related services to customers and/or is used to manage services ordered by customers. The example interface 172 receives orders from customers that define service level agreements including rerouting requirements and/or preferences. The interface 172 collects the rerouting requirements from a customer via, for example, the Internet, over the phone, and/or through the mail, and passes the customer information to the business management layer 302. The business management layer 302 forwards the rerouting requirements to a service management layer 304.

To manage and/or provide service related control to the packet-switched communication network 115 of FIG. 1, the example service provider 170 of FIG. 3 includes a service management layer 304. The example service management layer 304 of FIG. 3 supports an abstraction of the entire packet-switched communication network 115 including features and services and their association with the customers. The example service management layer 304 receives information from a customer service management center (CSMC) 312 that provides control via a platform machine readable medium in the service management layer 304. These controls are typically either service related and/or customer related including provisioning and reload of service logic programs, customer data, trouble isolation and restore.

The example service management layer 304 of FIG. 3 receives the rerouting requirements from the example business management layer 302 and provisions the rerouting requirements into data supported by the example routers 120-134 and/or the example layer 1 defect managers 190 of FIGS. 1 and 2. Additionally, the service management layer 304 stores the routing requirements into the rerouting database 174 of FIG. 1. The service management layer 304 of FIG. 3 sends the rerouting requirements to the example layer 1 defect managers 190 via the packet-switched communication system 115.

For example, the customer location A 104 requests a defect counter threshold of 1000 ms and a clear counter threshold of 3000 ms. These values may correspond to an assigned precedence bit value of '010'. Additionally, the customer A 104 may specify that the rerouting requirements should be applied to all IP traffic from specific IP addresses and/or addressed to specific IP addresses. The example business management layer 302 of FIG. 3 receives these requirements from the example interface 172 and forwards them to the example service management layer 304. The example service management layer 304 of FIG. 3 stores the requirements within the example routing database 174 and distributes the requirements to the example layer 1 defect managers 190. Additionally, the service management layer 304 may update the gateway and/or WAN of the customer location A 104 with the precedence bit value '010' such that the customer location A 104 adds that precedence bit value to the ToS headers of associated IP data packets. When a customer specifies a defect counter threshold and/or a clear counter threshold that does not correspond with an already assigned precedence bit value, the service provider 170 may create and/or assign a new precedence bit value. Alternatively, each customer may be assigned a different precedence bit value regardless of whether their defect counter threshold(s) and clear counter threshold(s) match that of another customer.

To manage and control the packet-switched communication network 115 and elements of the packet-switched communication network 115, the example service provider 170 of FIG. 3 includes a network management layer 306. The example network management layer 306 of FIG. 3 is responsible for network maintenance, traffic management, network performance, and capacity management. The network management layer 306 may use the rerouting requirements specified by customers to ensure that rerouting rules are adhered to by the example routers 120-134 within the example packet-switched communication network 115.

Communicatively coupled to the example network management layer 306 are one or more work centers (WCs) 314. The example WCs 314 of FIG. 3 manage the network in real-time thereby, providing network maintenance functions, isolating troubles, running diagnostics, and/or rerouting traffic. The example WCs 314 provide a framework for network operators to display and/or work with the functions and/or data within the network management layer 306.

While an example manner of implementing the example service provider 170 of FIG. 1 is depicted in FIG. 3, one or more of the interfaces, data structures, elements, processes and/or devices illustrated in FIG. 3 may be combined, divided, rearranged, omitted, eliminated and/or implemented in any other way. For example, the example business management layer 302, the example service management layer 304, the example network management layer 306, the example interface 172, the example CSMC 312, the example rerouting database 174, the example WC 314 and/or, more generally, the example service provider 170 of FIG. 3 may be implemented separately and/or in any combination using, for example, machine-accessible instructions executed by one or more computing devices and/or computing platforms (e.g., the example processing platform P100 of FIG. 13). Further, the example business management layer 302, the example service management layer 304, the example network management layer 306, the example interface 172, the example CSMC 312, the example rerouting database 174, the example WC 314 and/or, more generally, the example service provider 170 may be implemented by hardware, software, firmware and/or any combination of hardware, software and/or firmware. Thus, for example, any of the example business management layer 302, the example service management layer 304, the example network management layer 306, the example interface 172, the example CSMC 312, the example rerouting database 174, the example WC 314 and/or, more generally, the example service provider 170 can be implemented by one or more circuit(s), programmable processor(s), ASIC(s), PLD(s) and/or FPLD(s), etc. When any of the appended claims are read to cover a purely software or firmware implementation, at least one of the example business management layer 302, the example service management layer 304, the example network management layer 306, the example interface 172, the example CSMC 312, the example rerouting database 174, the example WC 314 and/or, more generally, the example service provider 170 are hereby expressly defined to include a tangible medium such as a memory, DVD, CD, etc. to store the software and/or firmware. Further still, the example service provider 170 may include additional devices, servers, systems, networks, gateways, portals, and/or processors in addition to, or instead of, those illustrated in FIG. 3 and/or may include more than one of any or all of the illustrated devices, servers, networks, systems, gateways, portals, and/or processors.

Figures 7, 8, 9:
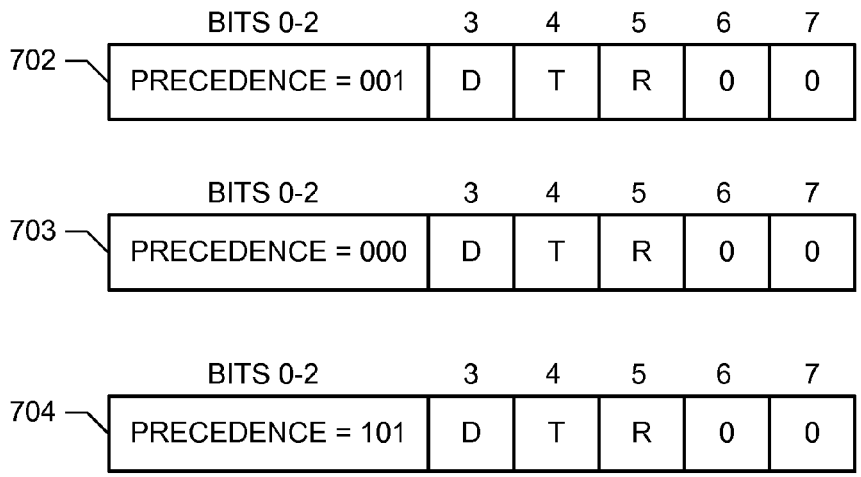
FIG. 7 shows example data structures that may be used to specify counters corresponding to different precedence bits.
FIG. 8 shows an example data structure that may be used to implement a rerouting table for the example communication system of FIG. 1.
FIG. 9 shows an example data structure that may be used to implement a VLAN profile table for the example communication system of FIG. 1.

FIG. 7 illustrates example data structures 702-704 that may be used to implement either or both of the example rerouting database 174 of FIG. 1 and/or the rules cache 206 of FIG. 2. The example data structures 702-704 of FIG. 7 represent respective type/class of service IP ToS headers that may be included in IP data packets. Each IP data packet may include a ToS header. The data structures 702-704 are shown for the IPv4 protocol, however, the data structures 702-704 may be modified for IPv6 and/or any other network protocol.

In the example data structures 702-704 of FIG. 7, bits 0-2 represent the precedence bits. Bit 3 represents a low-delay routing request, bit 4 represents a high-throughput routing request, bit 5 represents a high-reliability routing request, and bits 6 and 7 represent an explicit congestion notification field. The example precedence bits 0-2 of FIG. 7 may be used by the example layer 1 defect managers 190 of FIGS. 1 and 2 to specify rerouting instructions for customers within the IP traffic. By coding the precedence bits 0-2 in the IP header, the layer 1 defect managers 190 do not need separate rerouting tables with defect counter thresholds and clear counter thresholds for each customer.

The example precedence bits 0-2 of FIG. 7 are defined when, for example, a customer registers for and/or specifies a rerouting service level agreement. The customer may select a defect counter threshold and/or a clear counter threshold that are defined by a precedence bit value or alternatively, the customer may specify a defect counter threshold and a clear counter threshold and the example service provider 170 of FIG. 3 may define and/or assign a precedence bit value to the customer. For example, the customer associated with the data structure 702 has a precedence bit value of '001' that may correspond to a defect counter time of 500 ms and a clear counter time of 500 ms. The customer associated with the data structure 703 has a precedence bit value of '000' that may correspond to a defect counter time of 1000 ms and a clear counter time of 2000 ms. The customer associated with the data structure 704 has a precedence bit value of '101' that may correspond to a defect counter time of 200 ms and a clear counter time of 80000 ms.

Upon assigning a precedence bit 0-2 value to a customer, the example service provider 170 may distribute the defect counter threshold, clear counter threshold, and customer domain associated with the precedence bits 0-2 to the example routers 120-134 in the example packet-switched communication network 115 of FIG. 1. Upon distributing the precedence bit value definitions to the routers 120-134, layer 1 defect managers 190 implemented by the routers 120-134 use the distributed definitions to determine when and/or how to instruct the routers 120-134 to reroute customer IP traffic.

FIG. 8 illustrates a rerouting data structure 800 that may be used by the layer 1 defect manager 190 of FIG. 2 for rerouting IP traffic. The example rerouting data structure 800 of FIG. 8 may be stored within any of the example routers 120-134 and/or the example layer 1 defect managers 190. The example data structure 800 includes a customer IP address field 802, a subnet mask field 804, a defect counter field 806, a clear counter field 808, a cost field 810, and a next hop field 812. Additionally, the rerouting data structure 800 may include additional fields for a customer WAN, a customer name, layer 1 defect types, etc.

The example IP address field 802 of FIG. 8 includes the IP addresses of the customers who have registered for having their IP traffic rerouted upon the occurrence of a layer 1 defect. The data structure 800 includes IP addresses for two customers, 135.16.152.22 and 92.34.3.0. The example subnet mask field 804 of FIG. 8 includes a mask IP address for specifying the range of IP addresses that have an IP address associated with the IP address specified in the IP address field 802. The example layer 1 defect managers 190 use the IP addresses in the fields 802 and 804 to determine which IP traffic corresponds with which customer.

The example defect counter field 806 of FIG. 8 includes a customer specified defect counter threshold, and the example clear counter field 808 includes a customer specified clear counter threshold. For example, the customer with the IP address of 135.16.152.22 has specified a defect counter threshold of 120 ms and a clear counter threshold of 2000 ms. The example cost field 810 of FIG. 8 includes the maximum number of extra hops specified by customers for their IP traffic. For example, the customer with the IP address of 135.16.152.22 has specified that the rerouting of their IP traffic should not increase the routing by more than two hops. The example next hop field 812 of FIG. 8 includes an IP address of a router 120-134 via which the IP traffic of a customer is to be rerouted. For example, if a layer 1 defect occurs, the customer with the IP address of 135.16.152.22 specifies that the reroute path should be to the router at an IP address 208.18.205.14. In other examples, the service provider 170 may specify the IP address in the next hop field 812 or alternatively, the router 120-134 may add the value for the next hop field 812 based on data within the routing tables of the router 120-134.

FIG. 9 illustrates an example data structure 900 that may be used to implement rerouting using VLAN profiles of customers. The example data structure 900 of FIG. 9 may be stored within any of the example routers 120-134 and/or the layer 1 defect managers 190 of FIGS. 1 and 2. The example data structure 900 may be stored within the layer 1 defect manager 190 of a single router 120-134, and/or within the layer 1 defect managers 190 of a plurality of routers 120-134. The data structure 900 includes a VLAN number field 902, a customer name field 904, a defect counter field 906, and a clear counter field 908. In the illustrated example of FIG. 9, every VLAN customer may have a different customizable defect counter threshold and/or clear counter threshold.

To store a numerical identifier for each customer, the example data structure 900 includes the example VLAN number field 902. The example VLAN number field 902 of FIG. 9 includes a reference value assigned by the example service provider 170 to each customer VLAN. An identifier of each VLAN customer (e.g., a name, a geographic address, a phone number, etc.) it stored in the example customer name field 904.

Each of the example defect counter fields 906 of FIG. 9 includes a customer specified defect counter threshold. Each of the clear counter fields 908 includes a customer specified clear counter threshold. The example layer 1 defect managers 190 of FIGS. 1 and 2 use the example data structure 900 to lookup the reroute requirements for each VLAN customer. The layer 1 defect managers 190 may associate a customer with a particular VLAN based on the IP address of the customer.

For example, a customer may specify a certain groups of IP addresses as belonging to a VLAN. Upon detecting a layer 1 defect, a layer 1 defect manager 190 may use the data structure 900 to determine a defect counter threshold for each VLAN customer. When the duration of the defect counter reaches the length threshold(s) specified by the customers, the layer 1 defect manager 190 updates the routing table cache 220 to reroute customer traffic associated with the customer's VLAN. Likewise, upon receiving a notification of the correction of the layer 1 defect, the layer 1 defect manager 190 starts a clear counter. When the clear counter reaches a particular customer's clear counter threshold, the layer 1 defect manager 190 updates the routing table cache 220 accordingly.

FIGS. 10, 11, 12A, and 12B illustrate flowcharts representative of example machine-accessible instructions that may be carried out to implement the example layer 1 defect manager 190 of FIGS. 1 and/or 2. The example machine-accessible instructions of FIGS. 10, 11, 12A, and/or 12B may be carried out by a processor, a controller and/or any other suitable processing device. For example, the example machine-accessible instructions of FIGS. 10, 11, 12A, and/or 12B may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 13). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular machine-accessible instructions. Alternatively, some or all of the example machine-accessible instructions of FIGS. 10, 11, 12A, and/or 12B may be implemented using any combination(s) of ASIC(s), PLD(s), FPLD(s), discrete logic, hardware, firmware, etc. Also, some or all of the example machine-accessible instructions of FIGS. 10, 11, 12A, and/or 12B may instead be implemented manually or as any combination of any of the foregoing techniques, for example, any combination of firmware, software, discrete logic and/or hardware. Further, many other methods of implementing the example operations of FIGS. 10, 11, 12A, and/or 12B may be employed. For example, the order of execution of the blocks may be changed, and/or one or more of the blocks described may be changed, eliminated, sub-divided, or combined. Additionally, any or all of the example machine-accessible instructions of FIGS. 10, 11, 12A, and/or 12B may be carried out sequentially and/or carried out in parallel by, for example, separate processing threads, processors, devices, discrete logic, circuits, etc.

Figure 10:
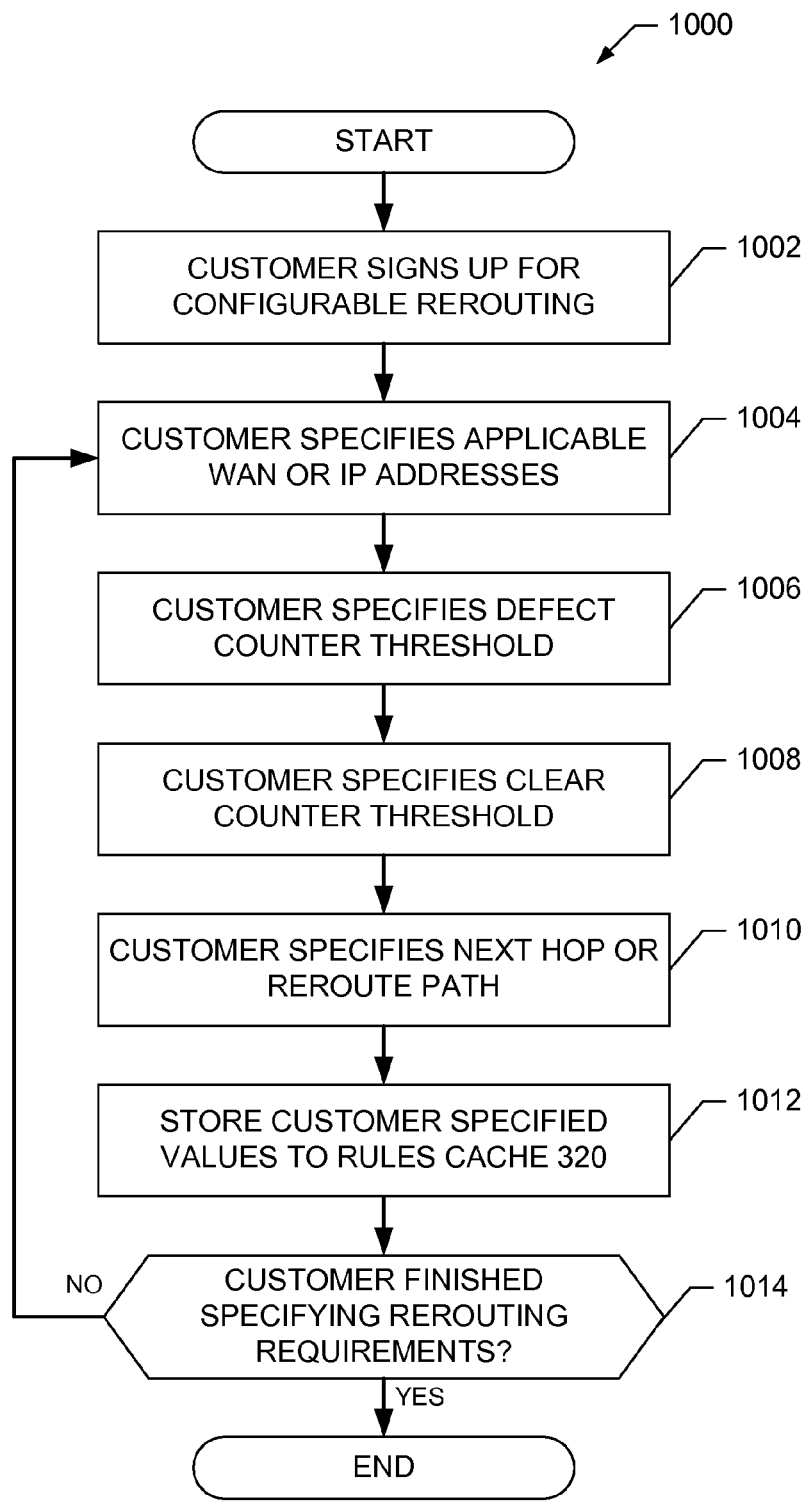
FIGS. 10 and 11 are flowcharts representative of example machine-accessible instructions that may be executed by, for example, a processor to implement the example service provider of FIG. 3.

The example machine-accessible instructions 1000 of FIG. 10 begin when a customer (e.g., network user) signs up for a service level agreement that includes customer specific rerouting of IP traffic with the service provider 170 (block 1002). The customer selects rerouting requirements including which IP traffic should be rerouted by specifying IP addresses and/or a WAN (block 1004). For example, a customer may only want to reroute IP traffic associated with certain office locations. The customer would specify the office location(s) by providing the IP address(es) assigned to the office location(s) and a subnet mask.

For each specified IP address and/or WAN, the customer specifies a defect counter threshold (block 1006) and a clear counter threshold (block 1008). The customer may select from a list of available defect counter thresholds and/or clear counter thresholds or alternatively, the customer may specify the threshold(s). In some examples, the customer specifies a next hop IP address and/or a reroute path (block 1010).

The service provider 170 provisions, stores, and/or distributes the specified rerouting requirements to the example rules cache 206 of FIG. 2 within one or more layer 1 defect managers 190 (block 1012). The service provider 170 then determines if the customer is finished specifying rerouting requirements (block 1014). If the customer has other IP addresses, WANs and/or domains to specify rerouting rules for (block 1014), control returns to block 1004. If the customer is finished specifying rerouting requirements (block 1014), control exits from the example machine-accessible instructions of FIG. 10.

Figure 11:
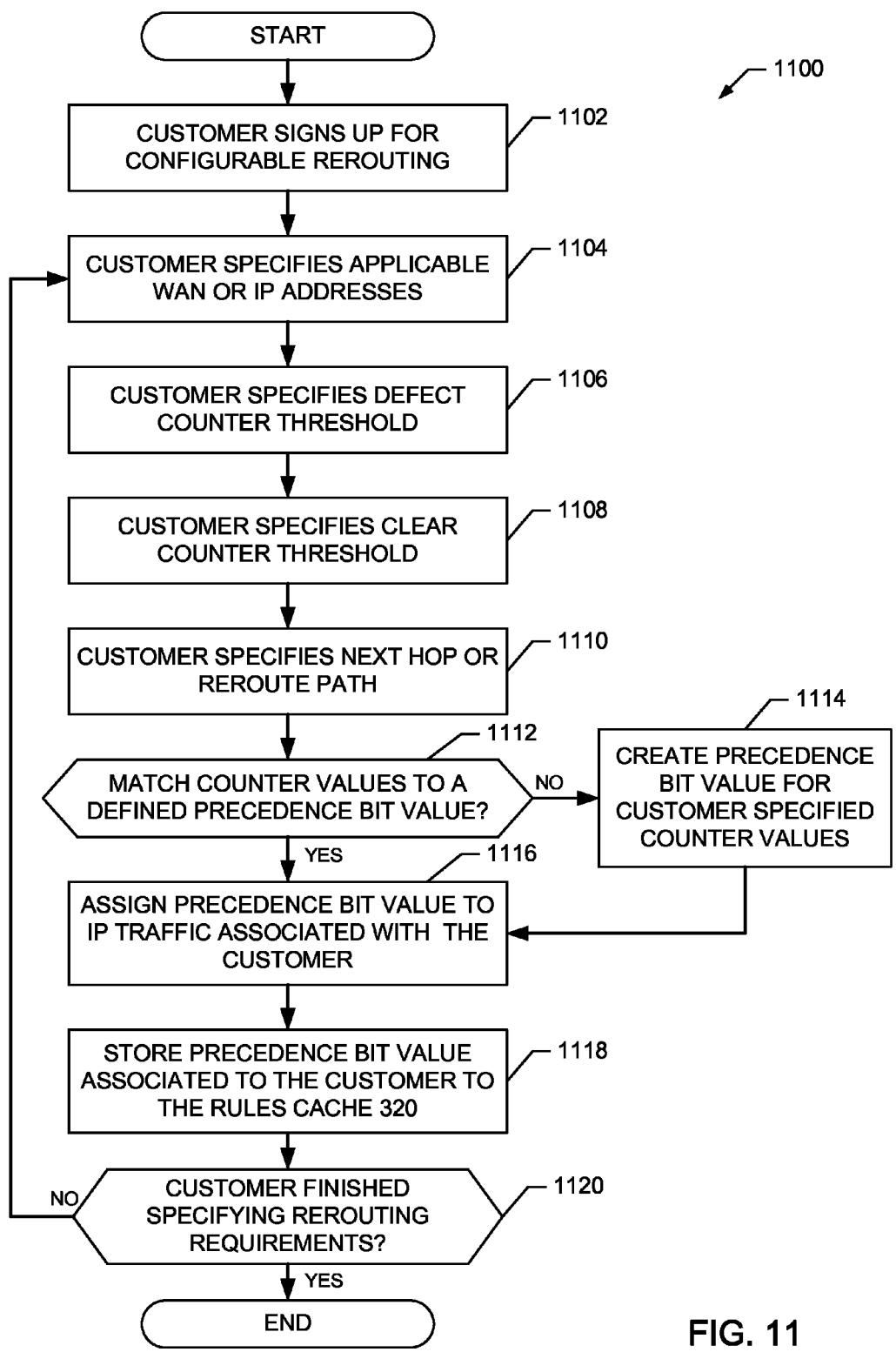

The example machine-accessible instructions 1100 of FIG. 11 may be executed upon the occurrence of a trigger generated remotely by, for example, a customer calling the service provider 170 to sign up for a service level agreement. The example machine-accessible instructions 1100 begin when a customer signs up for a service level agreement for configurable rerouting with the service provider 170 of FIG. 1 (block 1102). The customer selects rerouting requirements including which IP traffic should be rerouted by specifying the IP addresses and/or WAN (block 1104).

For each specified IP address and/or WAN, the customer selects a defect counter threshold (block 1106) and a clear counter threshold (block 1108). The customer may select from a list of available defect counter thresholds and/or clear counter thresholds or alternatively, the customer may specify the threshold(s). In some examples, the customer specifies a next hop IP address and/or a reroute path (block 1110).

The service provider 170 determines if the thresholds correspond with an already defined precedence bit value (block 1112). If there is a match (block 1112), the service provider 170 assigns the matching precedence bit value to IP traffic associated with the customer (block 1116). If there is not a match (block 1112), the service provider 170 creates a new precedence bit value for the customer specified counter values (block 1114). The service provider 170 then assigns the newly created precedence bit value to IP traffic associated with the customer and store the precedence bit value to the example rerouting database 174 of FIG. 1 (block 1116). Alternatively, the service provider 170 may create a precedence bit value for each customer regardless of whether multiple customers specify the same counter thresholds.

The service provider 170 provisions, stores, and/or distributes the rerouting requirements to the rules cache 206 within one or more of the example layer 1 defect managers 190 (block 1118). Next, the service provider 170 determines if the customer is finished specifying rerouting requirements (block 1120). If the customer has other IP addresses and/or domains to specify rerouting rules for, control returns to block 1104. If the customer is finished specifying rerouting requirements (block 1120), control exits from the example machine-accessible instructions of FIG. 11.

Figure 12A:
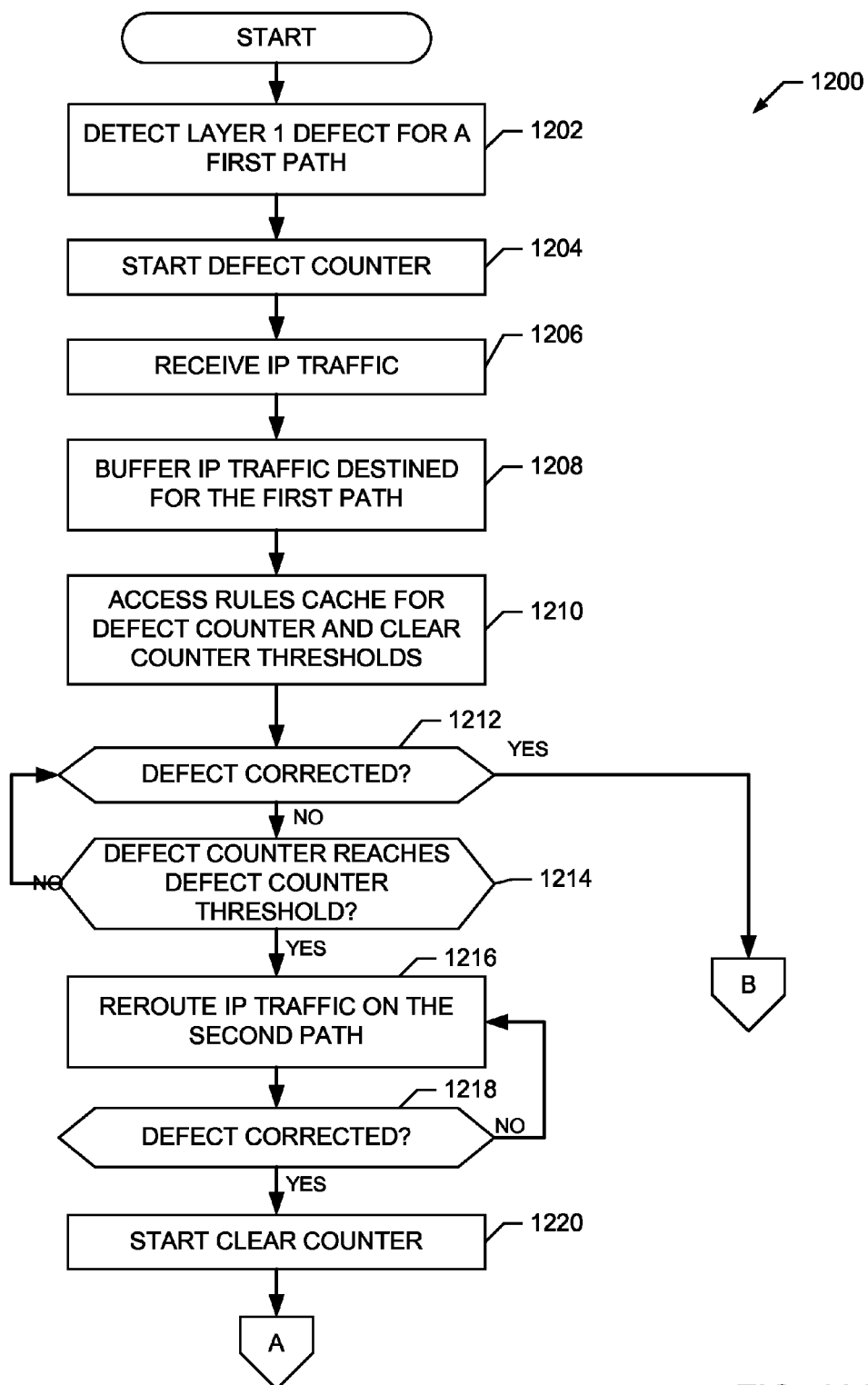
FIGS. 12A and 12B are flowcharts representative of example machine-accessible instructions that may be executed by, for example, a processor to implement the example layer 1 defect manager of FIG. 2.
Figure 12B:
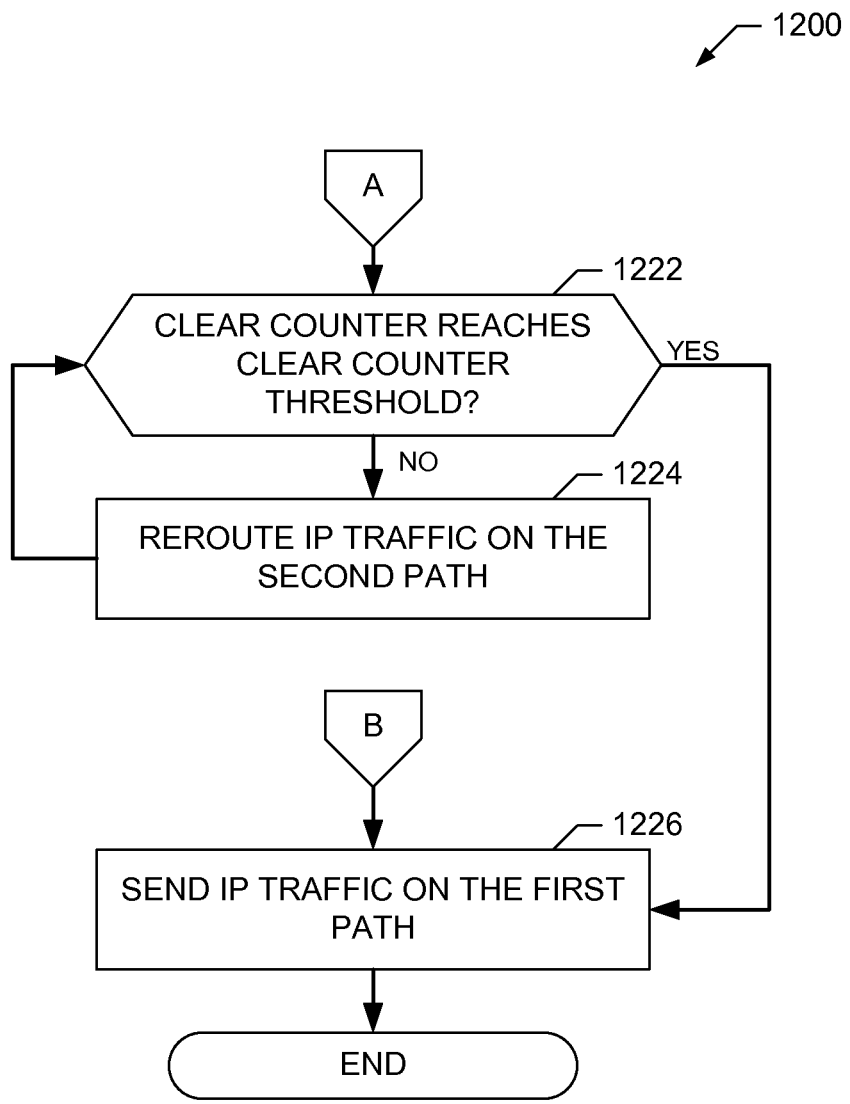

The example machine-accessible instructions 1200 of FIGS. 12A and 12B may be executed to implement the layer 1 defect managers 190 of FIGS. 1 and 2. The example machine-accessible instructions 1200 begin in FIG. 12A when the layer 1 defect manager 190 detects a layer 1 defect along a first path (block 1202). The network defect may include any type of layer 1 defect. The layer 1 defect manager 190 may detect the defect by receiving an indication of the layer 1 defect from the example diagnostics module 222 of FIG. 2. Upon detecting the layer 1 defect, the example timer module 212 starts a corresponding defect counter (block 1204). As the router 120-134 that implements the layer 1 defect manager 190 receives IP traffic that is to be routed on the first path (block 1206), the router buffers that IP traffic (block 1208).

The layer 1 defect manager 190 accesses the rules cache 206 of FIG. 2 to obtain the defect counter thresholds and clear counter thresholds for each customer (block 1210). The layer 1 defect manager 190 then determines if the layer 1 defect has been corrected (block 1212). If the layer 1 defect is corrected (block 1212), the IP traffic no longer needs to be rerouted and the corresponding router resumes sending the IP traffic along the first, original path in FIG. 12B (block 1226 of FIG. 12B).

Returning to block 1212, if the layer 1 defect is not corrected (block 1212), the layer 1 defect manager 190 determines if the defect counter has reached the defect counter threshold associated with any of the customers (block 1214). If the defect counter has not reached the defect counter threshold associated with any customers (block 1214), the corresponding router 120-134 continues buffering the IP traffic to be routed via the first path (block 1216), and the layer 1 defect manager 190 determines whether the defect has been corrected (block 1212). If the defect counter reaches the defect counter threshold specified by a first customer (block 1214), the layer 1 defect manager 190 updates the routing table to cause the corresponding router 120-134 to reroute the IP traffic associated with that first customer on a second path (block 1216). The second path may be an available connection to an adjacent router 120-134 capable of routing the IP traffic around the layer 1 defect. Additionally, for the customers with specified defect counter thresholds that have not reached a specified elapsed time since the layer 1 defect, the layer 1 defect manager 190 continues to determine whether the elapsed time of the layer 1 defect has reached the defect counter threshold(s) of those customers (block 1214).

For the first customer, the example machine-accessible instructions 1200 continue with the layer 1 defect manager 190 determining if the later 1 defect has been corrected (block 1218). If the layer 1 defect is not corrected (block 1218), the corresponding router 120-134 continues rerouting the IP traffic associated with the first customer on the second path (block 1216). If the layer 1 defect is corrected (block 1218), the layer 1 defect manager 190 starts the clear counter (block 1220).

Continuing in FIG. 12B, the layer 1 defect manager 190 determines whether the clear counter has reached the clear counter threshold associated with the first customer (block 1222). If the clear counter has not reached the clear counter threshold (block 1222), the corresponding router 120-134 continues rerouting the IP traffic associated with the first customer on the second path (block 1224). When the clear counter reaches the clear counter threshold (block 1222), the layer 1 defect manager 190 updates the routing table to cause the corresponding router 120-134 to route the IP traffic associated with the first customer along the original first path (block 1226). Control then exits from the example machine-accessible instructions 1200 of FIGS. 12A and 12B.

Figure 13:
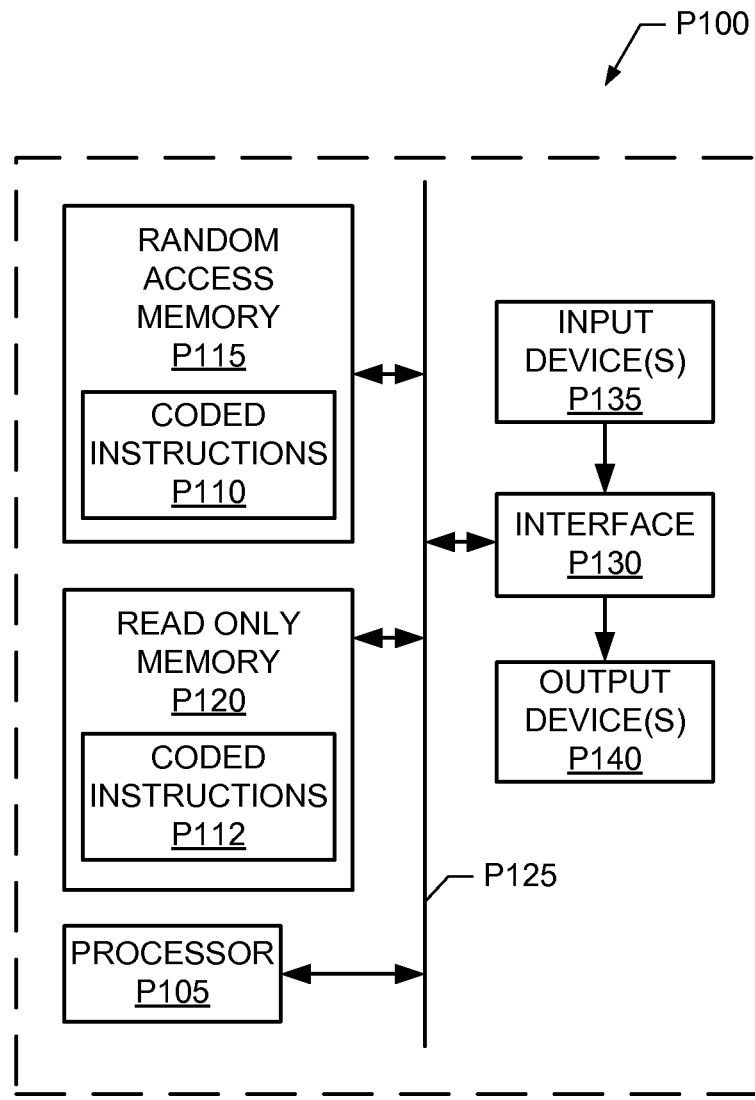
FIG. 13 is a block diagram of an example processor system that may be used to execute the example machine-accessible instructions of FIGS. 10, 11, 12A and/or 12B, to implement the example methods and apparatus described herein.

FIG. 13 is a schematic diagram of an example processor platform P100 that may be used and/or programmed to implement the example layer 1 defect manager 190, the example routers 120-134, and/or the example service provider 170 of FIGS. 1 and 2. For example, the processor platform P100 can be implemented by one or more general-purpose processors, processor cores, microcontrollers, etc.

The processor platform P100 of the example of FIG. 13 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 10, 11, 12A, and/or 12B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example routing database 174 of FIG. 1, the example rules cache 206, and/or the example routing table cache 220 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the example NICs 226 and 228 of FIG. 2 and/or the example interface 172 of FIG. 1.

At least some of the above described example methods and/or system are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to reroute Internet Protocol traffic, the method comprising:
    after detecting a defect in a first communication path for routing Internet Protocol user traffic associated with a first network user, causing a router to buffer the Internet Protocol user traffic for a first time period having a first duration before causing the router to reroute the Internet Protocol user traffic over a second communication path different from the first communication path, the first duration being based on a first threshold;
    after detecting correction of the defect in the first communication path, causing the router to continue to route the Internet Protocol user traffic over the second communication path for a second time period having a second duration before causing the router to revert to routing the Internet Protocol user traffic over the first communication path, the second duration being based on a second threshold, the first and second thresholds being adjustable based on a number of cycles of network defects and associated network corrections counted within a tracking period, wherein the first and second thresholds are defined initially based on precedence bits included within the Internet Protocol user traffic.

2. The method as defined in claim 1, further comprising:
    causing the router to route the Internet Protocol user traffic over the second communication path after expiration of the first time period; and
    causing the router to route the Internet Protocol user traffic over the first communication path after expiration of the second time period.

3. The method as defined in claim 1, further comprising:
    measuring the first time period using a first counter; and
    measuring the second time period using a second counter.

4. The method as defined in claim 1, wherein the Internet Protocol user traffic is first Internet Protocol user traffic, and further comprising:
    after detecting a defect in a third communication path for routing second Internet Protocol user traffic associated with a second network user, causing the router to buffer the second Internet Protocol user traffic for a third time period having a third duration; and
    in response to detecting correction of the defect in the third communication path before expiration of the third time period, causing the router to continue to route the second Internet Protocol user traffic over the third communication path instead without performing any rerouting.

5. A tangible machine readable storage device comprising machine readable instructions stored which, when executed, cause a machine to perform operations comprising:
    after detecting a defect in a first communication path for routing Internet Protocol user traffic associated with a first network user, causing a router to buffer the Internet Protocol user traffic for a first time period having a first duration before causing the router to reroute the Internet Protocol user traffic over a second communication path different from the first communication path, the first duration being based on a first threshold;
    after detecting correction of the defect in the first communication path, causing the router to continue to route the Internet Protocol user traffic over the second communication path for a second time period having a second duration before causing the router to revert to routing the Internet Protocol user traffic over the first communication path, the second duration being based on a second threshold, the first and second thresholds being adjustable based on a number of cycles of network defects and associated network corrections counted within a tracking period, wherein the first and second thresholds are defined initially based on precedence bits included within the Internet Protocol user traffic.

6. The storage device as defined in claim 5, wherein the operations further comprise:

causing the router to route the Internet Protocol user traffic over the second communication path after expiration of the first time period; and causing the router to route the Internet Protocol user traffic over the first communication path after expiration of the second time period.

7. The storage device as defined in claim 5, wherein the operations further comprise:

measuring the first time period using a first counter; and measuring the second time period using a second counter.

8. The storage device as defined in claim 5, wherein the Internet Protocol user traffic is first Internet Protocol user traffic, and the operation further comprise:

after detecting a defect in a third communication path for routing second Internet Protocol user traffic associated with a second network user, causing the router to buffer the second Internet Protocol user traffic for a third time period having a third duration; and in response to detecting correction of the defect in the third communication path before expiration of the third time period, causing the router to continue to route the second Internet Protocol user traffic over the third communication path instead without performing any rerouting.

9. An apparatus to reroute Internet Protocol traffic, the apparatus comprising:

a memory having machine readable instructions stored thereon; and a processor to execute the instructions to perform operations comprising:

after detecting a defect in a first communication path for routing Internet Protocol user traffic associated with a first network user, causing a router to buffer the Internet Protocol user traffic for a first time period having a first duration before causing the router to reroute the Internet Protocol user traffic over a second communication path different from the first communication path, the first duration being based on a first threshold;

after detecting correction of the defect in the first communication path, causing the router to continue to route the Internet Protocol user traffic over the second communication path for a second time period having a second duration before causing the router to revert to routing the Internet Protocol user traffic over the first communication path, the second duration being based on a second threshold, the first and second thresholds being adjustable based on a number of cycles of network defects and associated network corrections counted within a tracking period, wherein the first and second thresholds are defined initially based on precedence bits included within the Internet Protocol user traffic.

10. The apparatus as defined in claim 9, wherein the operations further comprise:

causing the router to route the Internet Protocol user traffic over the second communication path after expiration of the first time period; and causing the router to route the Internet Protocol user traffic over the first communication path after expiration of the second time period.

11. The apparatus as defined in claim 9, wherein the operations further comprise:

measuring the first time period using a first counter; and measuring the second time period using a second counter.

12. The apparatus as defined in claim 9, wherein the Internet Protocol user traffic is first Internet Protocol user traffic, and the operations further comprise:

after detecting a defect in a third communication path for routing second Internet Protocol user traffic associated with a second network user, causing the router to buffer the second Internet Protocol user traffic for a third time period having a third duration; and in response to detecting correction of the defect in the third communication path before expiration of the third time period, causing the router to continue to route the second Internet Protocol user traffic over the third communication path instead without performing any rerouting.

* * * * *